US010843100B2

(12) United States Patent
Khan et al.

(10) Patent No.: US 10,843,100 B2
(45) Date of Patent: *Nov. 24, 2020

(54) SPRAY DRIER ASSEMBLY FOR AUTOMATED SPRAY DRYING

(71) Applicant: Velico Medical, Inc., Beverly, MA (US)

(72) Inventors: Abdul Wahid Khan, Murrysville, PA (US); Dennis Brian Hubbard, Lancaster, MA (US)

(73) Assignee: Velico Medical, Inc., Beverly, MA (US)

( * ) Notice: Subject to any disclaimer, the term of this patent is extended or adjusted under 35 U.S.C. 154(b) by 374 days.

This patent is subject to a terminal disclaimer.

(21) Appl. No.: 15/603,699

(22) Filed: May 24, 2017

(65) Prior Publication Data

US 2017/0259186 A1  Sep. 14, 2017
US 2020/0298137 A9  Sep. 24, 2020

Related U.S. Application Data

(60) Continuation of application No. 13/953,198, filed on Jul. 29, 2013, now abandoned, which is a
(Continued)

(51) Int. Cl.
*B01D 1/18* (2006.01)
*B01J 2/04* (2006.01)

(52) U.S. Cl.
CPC . *B01D 1/18* (2013.01); *B01J 2/04* (2013.01)

(58) Field of Classification Search
None
See application file for complete search history.

(56) References Cited

U.S. PATENT DOCUMENTS 2,411,152 A   11/1946   Folsom
2,528,476 A   10/1950   Roos et al.
(Continued)

FOREIGN PATENT DOCUMENTS

CA   1182411     2/1985
CA   2065582    10/1992
(Continued)

OTHER PUBLICATIONS

Lea, et al. "The Reaction Between Proteins and Reducing Sugars in the "Dry" State" Biochemistry and Biophysics; University of Cambridge; Jun. 5, 1950; vol. 5; Issue 3/4; pp. 433-454.
(Continued)

*Primary Examiner* — Matthew D Krcha
(74) *Attorney, Agent, or Firm* — Antoinette G Giugliano PC

(57) ABSTRACT

A spray drier system is provided for spray drying a liquid sample such as blood plasma. The spray drier system may include a spray drier device adapted to couple with a spray drier assembly. The assembly may include an enclosure mounted to a frame. The assembly may receive a flow of drying gas which is directed by the enclosure shape towards a spray drying head mounted within the enclosure to the frame. Flows of a liquid sample may be further received by the head, which aerosolizes the liquid sample. Aerosolized liquid sample and drying air may be mixed within a drying chamber of the enclosure to produce dried sample and humid air. The dried sample and humid air may also be separated in a collection chamber of the enclosure, with the humid air exhausted from the enclosure.

7 Claims, 16 Drawing Sheets

Related U.S. Application Data continuation-in-part of application No. 13/660,387, filed on Oct. 25, 2012, now Pat. No. 8,601,712, which is a division of application No. 13/284,320, filed on Oct. 28, 2011, now Pat. No. 8,533,971.

(60) Provisional application No. 61/856,957, filed on Jul. 22, 2013, provisional application No. 61/820,428, filed on May 7, 2013, provisional application No. 61/706,759, filed on Sep. 27, 2012, provisional application No. 61/408,438, filed on Oct. 29, 2010.

(56) References Cited

U.S. PATENT DOCUMENTS

| | | |
|---|---|---|
| 2,575,175 A | 11/1951 | Kronisch |
| 3,228,838 A | 1/1966 | Rinfret et al. |
| 3,230,689 A | 1/1966 | Hussmann |
| 3,449,124 A | 6/1969 | Lipner |
| 3,507,278 A | 4/1970 | Werding |
| 3,644,128 A | 2/1972 | Lipner |
| 3,654,705 A | 4/1972 | Smith et al. |
| 3,735,792 A * | 5/1973 | Asizawa .................. B01D 1/18 159/4.04 |
| 4,187,617 A | 2/1980 | Becker, Jr. et al. |
| 4,251,510 A | 2/1981 | Tankersley |
| 4,347,259 A | 8/1982 | Suzuki et al. |
| 4,358,901 A | 11/1982 | Takabatake et al. |
| 4,376,010 A | 3/1983 | Gauvin |
| 4,378,346 A | 3/1983 | Tankersley |
| 4,597,868 A | 7/1986 | Watanabe |
| 4,600,613 A | 7/1986 | Yoshida |
| 4,645,482 A | 2/1987 | Yoshida |
| 4,705,612 A | 11/1987 | Shimomura et al. |
| 4,725,355 A | 2/1988 | Yamamoto et al. |
| 4,735,832 A | 4/1988 | Ichikawa et al. |
| 4,743,375 A | 5/1988 | Seita et al. |
| 4,774,019 A | 9/1988 | Watanabe et al. |
| 4,787,154 A | 11/1988 | Titus |
| 4,845,132 A | 7/1989 | Masuoka et al. |
| 4,861,632 A | 8/1989 | Caggiano |
| 4,966,699 A | 10/1990 | Sasaki et al. |
| 5,096,537 A | 3/1992 | Bergquist et al. |
| 5,139,529 A | 8/1992 | Seita et al. |
| 5,145,706 A | 9/1992 | Hagi et al. |
| 5,167,763 A | 12/1992 | Sakamoto |
| 5,244,578 A | 9/1993 | Ohnishi et al. |
| 5,252,221 A | 10/1993 | van Dommelen |
| 5,254,248 A | 10/1993 | Nakamura |
| 5,257,983 A | 11/1993 | Garyantes et al. |
| 5,267,646 A | 12/1993 | Inoue et al. |
| 5,279,738 A | 1/1994 | Seita et al. |
| 5,309,649 A | 5/1994 | Bergmann et al. |
| 5,372,811 A | 12/1994 | Yoder |
| 5,522,156 A | 6/1996 | Ware |
| 5,523,004 A | 6/1996 | Tanokura et al. |
| 5,529,821 A | 6/1996 | Ishikawa et al. |
| 5,547,576 A | 8/1996 | Onishi et al. |
| 5,562,919 A | 10/1996 | Doty et al. |
| 5,575,999 A | 11/1996 | Yoder |
| 5,581,903 A | 12/1996 | Botich |
| 5,582,794 A | 12/1996 | Hagiwara et al. |
| 5,610,170 A | 3/1997 | Inoue et al. |
| 5,647,142 A | 7/1997 | Andersen et al. |
| 5,727,333 A | 3/1998 | Folan |
| 5,924,216 A | 7/1999 | Takahashi |
| 5,993,804 A | 11/1999 | Read et al. |
| 6,004,576 A | 12/1999 | Weaver et al. |
| D430,939 S | 9/2000 | Zukor et al. |
| 6,148,536 A | 11/2000 | Lijima |
| 6,197,289 B1 | 3/2001 | Wirt et al. |
| 6,284,282 B1 | 9/2001 | Maa et al. |
| 6,299,906 B1 | 10/2001 | Bausch et al. |
| 6,308,434 B1 | 10/2001 | Chickering, III et al. |
| 6,308,826 B1 | 10/2001 | Merrell |
| 6,345,452 B1 | 2/2002 | Feuilloley et al. |
| 6,463,675 B1 | 10/2002 | Hansen et al. |
| 6,523,276 B1 | 2/2003 | Meldrum |
| 6,526,774 B1 | 3/2003 | Lu et al. |
| 6,560,897 B2 | 5/2003 | Chickering, III et al. |
| 6,569,447 B2 | 5/2003 | Kisic et al. |
| 6,582,654 B1 | 6/2003 | Kral et al. |
| 6,723,497 B2 | 4/2004 | Wolkers et al. |
| 6,893,412 B2 | 5/2005 | Saito et al. |
| 7,007,406 B2 | 3/2006 | Wang et al. |
| 7,089,681 B2 | 8/2006 | Herbert et al. |
| 7,094,378 B1 | 8/2006 | Goodrich, Jr. et al. |
| 7,297,716 B2 | 11/2007 | Shanbrom |
| 7,419,682 B2 | 9/2008 | Campbell et al. |
| 7,527,805 B2 | 5/2009 | Crenshaw et al. |
| 7,648,699 B2 | 1/2010 | Goodrich et al. |
| 7,931,919 B2 | 4/2011 | Bakaltcheva et al. |
| 7,993,310 B2 | 8/2011 | Rosiello |
| 8,322,046 B2 | 12/2012 | Wang et al. |
| 8,398,732 B2 | 3/2013 | Turok et al. |
| 8,407,912 B2 | 4/2013 | Hubbard, Jr. et al. |
| 8,434,242 B2 | 5/2013 | Hubbard, Jr. et al. |
| 8,449,520 B2 | 5/2013 | Pepper et al. |
| 8,518,452 B2 | 8/2013 | Bjornstrup et al. |
| 8,533,971 B2 | 9/2013 | Hubbard, Jr. et al. |
| 8,533,972 B2 | 9/2013 | Hubbard, Jr. et al. |
| 8,595,950 B2 | 12/2013 | Hubbard, Jr. et al. |
| 8,601,712 B2 | 12/2013 | Hubbard, Jr. et al. |
| 8,968,879 B2 | 3/2015 | Inaba et al. |
| 9,440,011 B2 | 9/2016 | Van Waeg et al. |
| 9,545,379 B2 | 1/2017 | Liu et al. |
| 9,561,184 B2 | 2/2017 | Khan et al. |
| 9,561,893 B2 | 2/2017 | Root et al. |
| 9,863,699 B2 | 1/2018 | Corbin, III et al. |
| 10,022,478 B2 | 7/2018 | Anzai et al. |
| 10,376,614 B2 | 8/2019 | Kohama et al. |
| 10,377,520 B2 | 8/2019 | Root et al. |
| 10,539,367 B2 | 1/2020 | Corbin, III et al. |
| 2002/0122803 A1 | 9/2002 | Kisic et al. |
| 2002/0182195 A1 | 12/2002 | Marguerre et al. |
| 2003/0037459 A1 | 2/2003 | Chickering, II et al. |
| 2003/0099633 A1 | 5/2003 | Campbell et al. |
| 2003/0103962 A1 | 6/2003 | Campbell et al. |
| 2003/0143518 A1 | 7/2003 | Luck et al. |
| 2003/0180283 A1 | 9/2003 | Batycky et al. |
| 2003/0186004 A1 | 10/2003 | Koslow |
| 2003/0190314 A1 | 10/2003 | Campbell et al. |
| 2003/0209245 A1 * | 11/2003 | Poole ................ A61M 15/0028 128/203.15 |
| 2004/0058309 A1 | 3/2004 | Washizu et al. |
| 2004/0086420 A1 | 5/2004 | MacPhee et al. |
| 2004/0110871 A1 | 6/2004 | Perrut et al. |
| 2004/0146565 A1 | 7/2004 | Strohbehn et al. |
| 2004/0202660 A1 | 10/2004 | Campbell et al. |
| 2004/0247628 A1 | 12/2004 | Lintz et al. |
| 2005/0170068 A1 | 8/2005 | Roodink et al. |
| 2005/0186183 A1 | 8/2005 | DeAngelo et al. |
| 2005/0271674 A1 | 12/2005 | Campbell et al. |
| 2006/0045907 A1 | 3/2006 | Campbell et al. |
| 2006/0088642 A1 | 4/2006 | Boersen et al. |
| 2006/0130768 A1 | 6/2006 | Crenshaw et al. |
| 2006/0216687 A1 | 9/2006 | Alves-Filho et al. |
| 2006/0222980 A1 * | 10/2006 | Makino ..................... B01J 2/04 430/105 |
| 2007/0014806 A1 | 1/2007 | Marguerre et al. |
| 2007/0084244 A1 | 4/2007 | Rosenflanz et al. |
| 2007/0166389 A1 | 7/2007 | Bakaltcheva |
| 2008/0058469 A1 | 3/2008 | Abe et al. |
| 2008/0060213 A1 | 3/2008 | Gehrmann et al. |
| 2008/0119818 A1 | 5/2008 | Bakaltcheva et al. |
| 2008/0138340 A1 | 6/2008 | Campbell et al. |
| 2008/0145444 A1 | 6/2008 | Merchant et al. |
| 2008/0145834 A1 | 6/2008 | Ho et al. |
| 2008/0213263 A1 | 9/2008 | Campbell et al. |
| 2008/0234653 A1 | 9/2008 | McCarthy et al. |
| 2008/0317640 A1 | 12/2008 | Mayer |
| 2009/0092678 A1 | 4/2009 | Marguerre et al. |
| 2009/0155410 A1 | 4/2009 | Crenshaw et al. |
| 2009/0145783 A1 | 6/2009 | Forker |

(56) References Cited

U.S. PATENT DOCUMENTS

| | | |
|---|---|---|
| 2009/0223080 A1 | 9/2009 | McCarthy et al. |
| 2010/0108183 A1 | 5/2010 | Rosiello |
| 2010/0215667 A1 | 8/2010 | Campbell et al. |
| 2010/0233671 A1 | 9/2010 | Bakaltcheva |
| 2010/0273141 A1 | 10/2010 | Bakaltcheva et al. |
| 2011/0142885 A1* | 6/2011 | Haley ............... A61K 35/16 424/400 |
| 2012/0027867 A1 | 2/2012 | Fischer et al. |
| 2012/0103536 A1 | 5/2012 | Hubbard, Jr. et al. |
| 2012/0167405 A1 | 7/2012 | Hubbard, Jr. et al. |
| 2013/0000774 A1 | 1/2013 | Rosiello |
| 2013/0126101 A1 | 5/2013 | Hubbard, Jr. et al. |
| 2013/0129817 A1* | 5/2013 | Consigny ............ A61K 31/335 424/450 |
| 2013/0209985 A1 | 8/2013 | Hoke et al. |
| 2013/0243877 A1 | 9/2013 | Haley et al. |
| 2013/0264288 A1 | 10/2013 | Hlavinka et al. |
| 2014/0083627 A1 | 3/2014 | Khan et al. |
| 2014/0083628 A1 | 3/2014 | Khan et al. |
| 2014/0088768 A1 | 3/2014 | Haley et al. |
| 2014/0221873 A1 | 8/2014 | Hayakawa et al. |
| 2014/0230266 A1 | 8/2014 | Luy et al. |
| 2015/0158652 A1 | 6/2015 | Root et al. |
| 2015/0354894 A1 | 12/2015 | Corbin, III et al. |
| 2016/0015863 A1 | 1/2016 | Gupta et al. |
| 2016/0082043 A1 | 3/2016 | Khan et al. |
| 2016/0084572 A1 | 3/2016 | Khan et al. |
| 2016/0113965 A1 | 4/2016 | DaCorta et al. |
| 2017/0113824 A1 | 4/2017 | Root et al. |
| 2017/0203871 A1 | 7/2017 | Murto et al. |
| 2017/0259186 A1 | 9/2017 | Khan et al. |
| 2018/0153811 A1 | 6/2018 | Fischer et al. |
| 2019/0106254 A1 | 4/2019 | Weimer et al. |
| 2019/0241300 A1 | 8/2019 | Root et al. |
| 2019/0298765 A1 | 10/2019 | DaCorta et al. |

FOREIGN PATENT DOCUMENTS

| | | | |
|---|---|---|---|
| CA | 2816090 | 5/2012 | |
| CH | 622683 | 4/1981 | |
| CN | 1315139 | 10/2001 | |
| CN | 102206273 | 10/2011 | |
| DE | 3507278 | 9/1986 | |
| EP | 0058903 | 9/1982 | |
| EP | 1050220 | 8/2000 | |
| EP | 2745922 A2 | 6/2014 | |
| EP | 2745923 A2 | 6/2014 | |
| GB | 573500 | 11/1945 | |
| GB | 886533 | 10/1962 | |
| GB | 964367 | 7/1964 | |
| GB | 975786 | 11/1964 | |
| GB | 1188168 | 4/1970 | |
| GB | 2003042 | 3/1979 | |
| GB | 2003042 A | 3/1979 | |
| JP | 56011903 | 2/1981 | |
| JP | 63218201 | 9/1988 | |
| JP | 01011618 | 1/1989 | |
| JP | 03131302 | 6/1991 | |
| JP | 03181301 | 8/1991 | |
| JP | 5245301 | 9/1993 | |
| JP | 525910 | 10/1993 | |
| JP | 10182124 | 7/1998 | |
| JP | 3219828 B2 | 10/2001 | |
| JP | 2002009037 | 1/2002 | |
| JP | 2005191275 | 7/2005 | |
| JP | 2007216158 | 8/2007 | |
| WO | WO9615849 | 5/1996 | |
| WO | WO9618312 | 6/1996 | |
| WO | WO9738578 | 10/1997 | |
| WO | WO9907236 | 2/1999 | |
| WO | WO9907390 | 2/1999 | |
| WO | WO0056166 | 9/2000 | |
| WO | WO0172141 | 10/2001 | |
| WO | WO02078741 | 10/2002 | |
| WO | WO02078742 | 10/2002 | |
| WO | WO2002092213 A1 | 11/2002 | |
| WO | WO03030654 | 4/2003 | |
| WO | WO03030918 | 4/2003 | |
| WO | WO03063607 | 8/2003 | |
| WO | WO2004075988 | 9/2004 | |
| WO | WO2004078187 | 9/2004 | |
| WO | 2005079755 A2 | 9/2005 | |
| WO | WO2007036227 | 4/2007 | |
| WO | WO2008122288 A1 | 10/2008 | |
| WO | WO2008143769 A1 | 11/2008 | |
| WO | WO-2010111132 A2 * | 9/2010 | ............... B01J 2/04 |
| WO | WO2010113632 A1 | 10/2010 | |
| WO | WO2010117976 | 10/2010 | |
| WO | WO2011075614 A2 | 6/2011 | |
| WO | 2012058575 A2 | 5/2012 | |
| WO | WO2013141050 A1 | 9/2013 | |
| WO | WO2016036807 | 3/2016 | |
| WO | WO2016208675 | 12/2016 | |
| WO | WO2020111132A21 | 6/2020 | |

OTHER PUBLICATIONS

Carpenter, et al. "Rational Design of Stable Lyophilized Protein Formulations: Theory and Practice" Pharm Biotechnol; 2002; vol. 13; pp. 109-133.

Schmid "Spray Drying of Protein Precipitates and Evaluation of the Nano Spray Dryer B-90" Dissertation, Ludwig Maximilian University of Munich; Jan. 3, 2011.

Shuja, et al. "Development and Testing of Low-Volume Hyperoncotic, Hyperosmotic Spray-Dried Plasma for the Treatment of Trauma-Associated Coagulopathy" J Trauma; May 2010; vol. 68; Issue 5; pp. 1084-1098.

Bakaltcheva, et al. "Freeze-dried whole plasma: Evaluating sucrose, trehalose, sorbitol, mannitol and glycine as stabilizers" Thrombosis Research; 2007; vol. 120; pp. 105-116.

European Search Report, EP Application No. 14154366, dated Aug. 21, 2014.

European Search Opinion, EP Application No. 14154366, dated Aug. 21, 2014.

International Search Report and Written Opinion, PCT/US2010/049176, dated Nov. 4, 2010.

International Search Report and Written Opinion, PCT/US2011/058358, dated Jul. 4, 2012.

European Search Report, EP Application No. 14154366, dated Aug. 29, 2014.

European Search Opinion, EP Application No. 14154366, dated Aug. 29, 2014.

Answer, Affirmative Defenses, Counterclaims, Cross-Claims and Jury Demand, *Entegrion, Inc.* vs *Velico Medical, Inc.*, dated Dec. 3, 2012.

Civil Action Cover Sheet; *Entegrion, Inc.* vs *Velico Medical, Inc.*, dated Oct. 19, 2012.

Complaint including Exhibit A, B, and C; *Entegrion, Inc.* vs *Velico Medical, Inc.*, dated Oct. 19, 2012.

Mini Spray Dryer B-290- Application Note; www.buchi.com; Mar. 30, 2008.

Nano Spray Dryer B-90; www.buchi.com; Jul. 18, 2011.

Mini Spray Dryer System Configuration; www.buchi.com; Jan. 8, 2007.

Quick Operation Guide; Mini Spray Dryer B-290; www.buchi.com; Sep. 16, 2004.

Process Parameters; www.buchi.com; Nov. 21, 2008.

Training Papers Spray Drying; Version B; www.buchi.com; 19 pages; Oct. 29, 2002.

Mini Spray Dryer B-290; www.buchi.com; May 10, 2007.

Operation Manual; Mini Spray Dryer B-290; Version G; www.buchi.com; Feb. 8, 2007.

International Preliminary Report on Patentability, PCT/US2011/058358, dated Apr. 30, 2013.

Edwards et al., The Preparation and Use of Dried Plasma for Transfusion; British Medical journal; vol. 1, No. 4131;Mar. 9, 1940; pp. 377-381.

(56) References Cited

OTHER PUBLICATIONS

Entegrion's Reply to Counterclaims; *Entegrion, Inc.* vs *Velico Medical, Inc*; Dated: Jan. 14, 2013.
Entegrion's Motion to Dismiss Counts I, II, V, VI and XI of Velico Medical, Inc's Counterclaims and Memorandum in Support of Entegrion's Motion to Dismiss Counts I, II, V, VI, and XI of Velico Medical,.'s Counterclaims; *Entegrion, Inc.* vs *Velico Medical, Inc*; Dated: Jan. 14, 2013.
International Preliminary Report on Patentability, PCT/US2010/049176, dated Feb. 18, 2014.

* cited by examiner

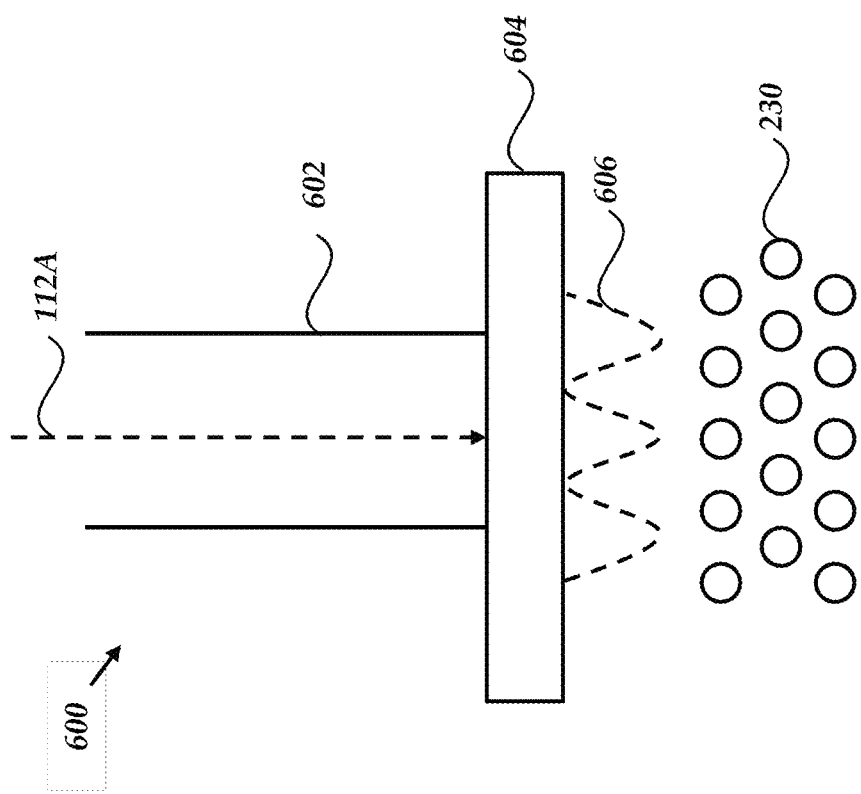

SPRAY DRIER ASSEMBLY FOR AUTOMATED SPRAY DRYING

RELATED APPLICATION(S)

This application is a continuation application of U.S. application Ser. No. 13/953,198, filed on Jul. 29, 2013 entitled "Spray Drier Assembly For Automated Spray Drying", which claims the benefit of priority of U.S. Provisional Patent Application No. 61/706,759, filed on Sep. 27, 2012 and entitled, "Automated Spray Drier System, U.S. Provisional Patent Application No. 61/820,428, filed on May 7, 2013 and entitled, "Functionally Closed System Equivalence For Aerosoling And Drying Gas," and U.S. Provisional Patent Application No. 61/856,957, filed on Jul. 22, 2013 and entitled, "Spray Drier Assembly For Automated Spray Drying" and this application is a continuation application of U.S. application Ser. No. 13/953,198, filed on Jul. 29, 2013 entitled "Spray Drier Assembly For Automated Spray Drying", which is a Continuation-In-Part of application Ser. No. 13/660,387, now U.S. Pat. No. 8,601,712, filed Oct. 25, 2012, granted Dec. 10, 2013, entitled "System And Method For Spray Drying A Liquid", which is a divisional application of U.S. application Ser. No. 13/284,320, now U.S. Pat. No. 8,533,971, filed on Oct. 28, 2011, granted Sep. 17, 2013, entitled: System And Method For Spray Drying A Liquid", which claims the benefit of provisional application No. 61/408,438, filed Oct. 29, 2010, entitled "Spray Dried Human Plasma". The entire teachings of Application Nos. 61/706,759, 61/820,428, and 61/856,957 are hereby incorporated herein by reference.

GOVERNMENT SUPPORT

This invention was made with Government support under contract HHSO100201200005C awarded by the Biomedical Advanced Research and Development Authority (BARDA). The Government has certain rights in the invention.

BACKGROUND

Making up about 55% of the total volume of whole blood, blood plasma is a whole blood component which holds blood cells in suspension. Blood plasma further contains a mixture of over 700 proteins and additional substances that perform functions necessary for bodily health, including clotting, protein storage, and electrolytic balance, amongst others. When extracted from whole blood, blood plasma may be employed to replace bodily fluids, antibodies, and clotting factors. Accordingly, blood plasma is extensively used in medical treatments.

To facilitate storage and transportation of blood plasma until use, plasma is typically preserved by fresh-freezing. Fresh-Frozen blood Plasma (FFP) is obtained through a series of steps involving centrifugation of whole blood to separate plasma and then freezing the collected plasma within about 8 hours of drawing the whole blood. In the United States, the American Association of Blood Banks (AABB) standard for FFP is up to 12 months from the date of preparation when stored at −18° C. or colder. FFP may also be stored for up to 7 years if maintained at −65° C. or colder from preparation until the time at which it used. In Europe, FFP has a shelf life of only 3 months if stored at temperatures between −18° C. to −25° C., and for up to 36 months if stored at colder than −25° C. If thawed, European standards dictate that the plasma must be transfused immediately or stored at 1° C. to 6° C. and transfused within 24 hours. If stored longer than 24 hours, the plasma must be relabeled for other uses or discarded.

Notably, however, FFP must be kept within a temperature-controlled environment throughout its duration of storage to maintain its efficacy, which adds to the cost and difficulty of storage and transport. Furthermore, FFP must be thawed prior to use, resulting in a delay of 30-45 minutes before it may be used after removal from cold storage.

Accordingly, there is a need to develop alternative techniques for storage of plasma.

SUMMARY

In an embodiment, a spray drier assembly is provided for spray drying a liquid sample. The spray drier assembly includes an enclosure having a first end and a second end and a drying gas inlet adjacent to the first end adapted to receive a flow of drying gas. The spray drier assembly further includes a spray drying head within the spray dryer assembly enclosure and positioned within the path of the flow of drying gas. The spray drying head is adapted to receive a flow of aerosolizing gas and a flow of liquid sample, output an aerosolized flow of liquid sample, and expose the aerosolized flow of liquid sample to the drying gas passing therethrough. The spray drier assembly enclosure also includes a drying chamber positioned between the spray drying head and the second end of the enclosure adapted to receive the aerosolized flow of liquid sample and drying gas and separate the aerosolized flow of liquid sample into a dried powder suspended in humid air. The spray drier assembly enclosure also includes a collection chamber including a first filter adapted to separate the dried powder from the humid air and an exhaust port allowing the humid air to exit the second end of the enclosure. The spray drier assembly also includes a second filter, disposed between the drying gas inlet and the spray drying head.

In an embodiment, the spray drier assembly may further include a removable drying gas inlet cover that inhibits contaminants from entering the spray drier assembly through the drying gas inlet. In a further embodiment, the spray drying head may include a plurality of fins, spaced apart by respective openings, where the plurality of fins are adapted to direct the flow of drying gas. The plurality of fins may extend outwards from a circular nozzle positioned at about the center of the spray drying head. The plurality of fins may be oriented at a non-zero angle with respect to a surface normal extending outwards from the circular nozzle in the plane of the spray drier head. The plurality of fins may alternatively or additionally be tilted at an angle such that a surface normal to the plane of the fins points out of the plane of the spray drying head.

In an embodiment of the spray drier assembly, the spray drying head may be adapted to direct the flow of drying gas exiting the spray drying head in a helical path.

In an embodiment of the spray drier assembly, the drying gas inlet may be adapted to receive the flow of drying gas parallel to a longitudinal axis of the enclosure. In an alternative embodiment, the drying gas inlet may be adapted to receive the flow of drying gas perpendicular to a longitudinal axis of the enclosure.

In an embodiment of the spray drier assembly, the drying gas inlet may be adapted to receive the flow of drying gas at different rates and different temperatures when it is in fluid communication with the spray drier device.

In an embodiment, the spray drier assembly may further include a frame positioned within the enclosure and extending from the first end of the enclosure to the second end of the enclosure. The spray drying head may be attached to the frame adjacent to the first end of the enclosure. The frame may direct, in part, the flow of the drying gas. The first filter may be attached to the frame.

In another embodiment, a spray drier assembly is provided for spray drying a liquid sample. The spray drier assembly may include a spray drier assembly body enclosing a frame. The frame may define a first body portion, a second body portion, and a third body portion, where the first and second body portions are separated by a first transition zone and the second and third body portions separated by a second transition zone. The spray drier assembly may also include a spray drying head having a body. At least a portion of the body may be positioned within the first transition zone. The spray drying head is adapted to receive a flow of aerosolizing gas and a flow of liquid sample and output an aerosolized flow of liquid sample. A drying chamber may also be positioned within the second body portion of the spray drier assembly body, where the drying chamber is adapted to receive the aerosolized flow of liquid sample and a drying gas and output dried sample powder and humid air. A collection chamber may also be positioned within the third body portion of the spray drier assembly body, where the collection chamber receives the dried powder and humid air in a first portion and includes a filter adapted to separate the dried powder and humid air.

In an embodiment of the spray drier assembly, at least one of the flow of drying gas, the flow of aerosolizing gas, and the humid air is adapted to urge the dried powder from the drying chamber to the collection chamber.

In a further embodiment of the spray drier assembly, the spray drier assembly is adapted for thermal communication with at least one heat source, where the at least one heat source is positioned outside of the spray drier assembly and wherein the at least one heat source is adapted to heat the spray drier assembly by electromagnetic radiation. In a further embodiment, the spray drier assembly is adapted for thermal communication with at least two of the heat sources, where the first heat source heats the drying chamber to a first temperature and the second heat source heats the collection chamber to a second temperature different than the first temperature.

In an embodiment of the spray drier assembly, a width of the frame may decrease within the first and second transition zones as compared to the first, second, and third body portions.

In a further embodiment of the spray drier assembly, the spray drying head may further include an outer wall, a center portion, and a plurality of fins extending from the center portion to the outer wall. The plurality of fins may define a plurality of openings extending through the thickness of the spray drying head. In a further embodiment of the spray drier assembly, the center portion of the spray drying head may be circular and the plurality of fins may extend radially outward from the center portion. The plurality of fins may extend outward from the center portion at a non-zero angle with respect to a surface normal extending outward from the center portion in the plane of the spray drying head.

In a further embodiment of the spray drier assembly, the center portion of the spray drying head includes a first inlet that is adapted to receive the flow of liquid sample, a second inlet that is adapted to receive the flow of aerosolizing gas, and an egress port in fluid communication with the first inlet and the second inlet. The liquid sample and the aerosolizing gas may contact one another upon exit of the egress port to form the aerosolized flow of liquid sample. In an embodiment, the egress port may be adapted to direct the flow of liquid sample and the flow of aerosolizing gas so as to meet and output the aerosolized flow of liquid sample directed parallel to a longitudinal axis of the spray drier assembly. In an embodiment, the portions of the spray drying head body including the first and second inlets are positioned outside of the first transition zone. In a further embodiment, the portions of the spray drying head body including the first and second inlets are positioned within of the first transition zone. In an embodiment of the spray drier assembly, the filter may be attached to the frame. The filter may include a frame having first and second opposing edges defining an opening, a filter member positioned within the opening, a fold which brings the first opposing edges into contact, and a hermetic joint sealing the contacting first opposing edges together. The second opposing edges define an aperture. Dried powder and humid air may enter the first filter through the aperture.

In an embodiment of the spray drier assembly, the filter may further include first reinforcing ribs spanning the lateral distance between the first opposing edges and second reinforcing ribs spanning the lateral distance between the second opposing edges.

In another embodiment, the collection chamber may further include a second portion, separate from the first portion and in fluid communication with the first portion via the filter. The second portion may further contain a desiccant. The collection chamber may further include a one-way valve adapted to permit the humid air to exit the collection chamber. The one-way valve may be adapted for fluid communication with a vacuum source for urging the humid air to exit the collection chamber via the one-way valve. The one-way valve may be further adapted for fluid communication with a filter possessing a Bacterial Filtration Efficiency (BFE) of $10^6$ or more.

In a further embodiment, a spray drier assembly is provided for drying a liquid sample. The spray drier assembly may include a spray drying head positioned within an enclosure. The spray drying head may be adapted to receive a flow of aerosolizing gas and a flow of liquid sample and output an aerosolized flow of liquid sample. The spray drying head may include an outer wall, a center portion; and a plurality of fins extending from the center portion to the outer wall, the plurality of fins defining a plurality of openings extending through the thickness of the spray drying head. The spray drier assembly may also include a drying chamber formed within the enclosure and adapted to receive the aerosolized flow of liquid sample and a flow of drying gas from the spray drying head and output dried sample powder and humid air. The spray drier assembly may also include a collection chamber formed within the enclosure, the collection chamber having a integrated filter adapted to separate the dried powder and humid air.

In an embodiment of the spray drier assembly, the collection chamber may further include an inlet port for receiving the dried powder and humid air, an exhaust port for conveying humid air out of the enclosure, and a first chamber and a second chamber. The first chamber may be defined by a first wall of the enclosure and a first side of the filter and the second chamber may be defined by a second wall of the enclosure and a second side of the filter. The first chamber may be contiguous with the inlet port and adapted to retain the dried powder and allow transmission of the humid air to the second chamber through the filter. The second chamber may be contiguous with the exhaust port.

In an embodiment of the spray drier assembly, at least one of the flow of aerosolizing gas, the flow of drying gas, and the humid air is adapted to urge the dried powder from the drying chamber to the collection chamber.

In a further embodiment, the spray drier assembly may include a one-way valve positioned in the inlet port, the one-way valve permitting flow of the humid air and dried powder from the drying chamber to the collection chamber and inhibiting flow of the humid air and dried powder from the collection chamber to the drying chamber.

In a further embodiment, the spray drier assembly may include a one-way valve positioned in the exhaust port, the one-way valve permitting flow of the humid air from the collection chamber and inhibiting flow of the humid air into the collection chamber.

In another embodiment, the collection chamber may further include a second portion, separate from the first portion and in fluid communication with the first portion. The second portion may further contain a desiccant.

The collection chamber may further include a one-way valve not positioned at the inlet port or the exhaust port and adapted to permit the humid air to exit the collection chamber adapted to permit the humid air to exit the collection chamber. The one-way valve may be adapted for fluid communication with a vacuum source for urging the humid air to exit the collection chamber via the one-way valve. The one-way valve may be further adapted for fluid communication with a filter with a Bacterial Filtration Efficiency (BFE) of $10^6$ or more.

In an embodiment of the spray drier assembly, the collection chamber may further include a plurality of spacers adapted to inhibit contact between the second side of the filter and the second wall of the enclosure within the collection chamber. The spacers may be selected from the group consisting of ribs and raised bumps.

In a further embodiment, a spray drier assembly is provided for spray drying a liquid sample. The spray drier assembly may include a spray drier assembly body having a first end and a second end, a source of drying gas in fluid communication with the first end of the spray drier assembly body, and a spray drying head enclosed within the spray dryer assembly body. The spray drying head may include an aerosolizer for aerosolizing a flow of liquid sample received at the spray drying head. The spray drier assembly may be adapted to output the aerosolized flow of liquid sample and expose the aerosolized flow of liquid sample to the flow of drying gas. The spray drier assembly may also include a filter, disposed between the drying gas inlet and the spray drying head and a drying chamber positioned between the spray drying head and the second end of the spray drier assembly body. The drying chamber may be adapted to separate the aerosolized flow of liquid sample into a dried sample powder suspended in humid air. The spray drier assembly may also include a collection chamber having a first filter adapted to separate the dried powder from the humid air and an exhaust port allowing the humid air to exit the second end of the spray drier body. The spray drier assembly may additionally include a second filter disposed between the drying gas inlet and the spray drying head.

In an embodiment of the spray drier assembly, the aerosolizer may provide ultrasonic waves in a wavelength and frequency sufficient to aerosolize the flow of liquid sample. The aerosolizer may also include one or more of an ultrasonic atomizing transducer, an ultrasonic humidified transducer, or Piezo ultrasonic atomizer.

In an embodiment of the spray drier assembly, the drying gas may travel in a flow to direct the transfer of dried liquid sample or the humid air. The flow of drying gas may also travel through one or more filters to remove contaminants from the flow of drying gas.

The spray drier assembly so configured may possess a variety of advantages. In one aspect, the frame may provide structural support to the enclosure and further provide a mechanism for channelling the flow of drying gas through the assembly. In another aspect, one or more filters may be provided with stand-offs to prevent the enclosure and the filter member of the filter from contacting one another, beneficially inhibiting undesirable pinch-off (i.e., obstruction) of gas flow from occurring within the filter. In a further aspect, the spray drier assembly may include a head configured to direct the flow of drying gas within a drying chamber of the assembly, increasing the length of the flow path of the aerosolized plasma and drying gas and reducing the time to dry the plasma for a given chamber size.

In an embodiment, the spray drier assembly may be adapted for thermal communication with at least one heat source, wherein the at least one heat source is positioned outside of the spray drier assembly and wherein the at least one heat source is adapted to heat the spray drier assembly by electromagnetic radiation.

In an embodiment, the spray drier assembly may be adapted for thermal communication with at least two of the heat sources, wherein the first heat source heats the drying chamber to a first temperature and the second heat source heats the collection chamber to a second temperature different than the first temperature.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

FIG. 6 is a schematic illustration of an alternative nozzle for the spray drier assembly head;

DETAILED DESCRIPTION

Figure 1A:
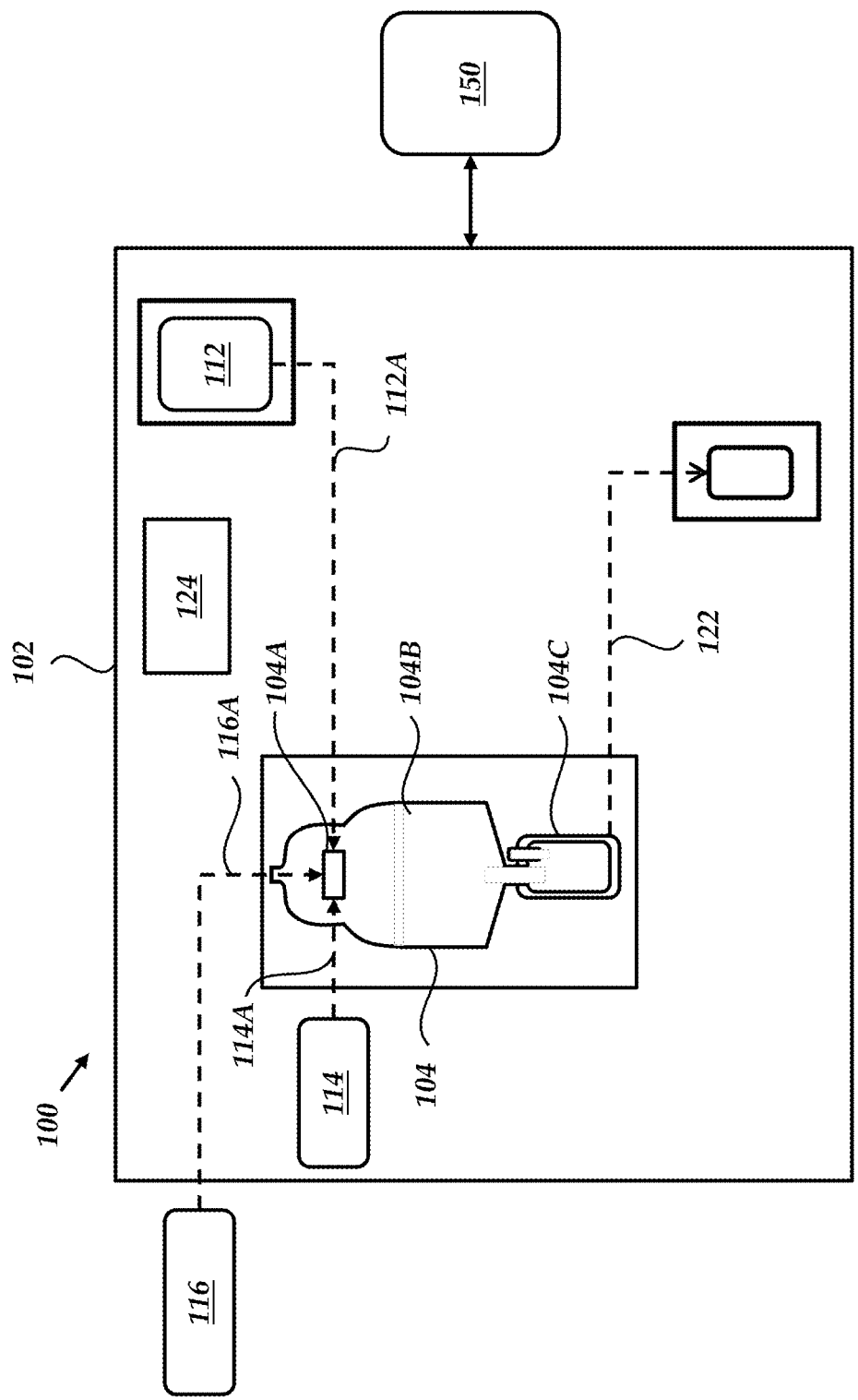
FIG. 1A is a schematic illustration of an embodiment of a spray drier system of the present disclosure, including a spray drier device 102 and a spray drier assembly.

Embodiments of the present disclosure are directed to systems and methods for spray drying a liquid sample. In certain embodiments, the liquid sample is plasma obtained from a blood donor. However, it may be understood that the disclosed embodiments may be employed to spray dry any mixtures of solid particles in a continuous liquid medium, including, but not limited to, colloids, suspensions, and sols.

In general, a spray drier system is provided for spray drying a liquid sample such as blood plasma. In an embodiment, the spray drier system of the present disclosure includes a spray drier device and a spray drier assembly. The spray drier device is adapted, in an aspect, to receive flows of an aerosolizing gas, a drying gas, and plasma liquid sample from respective sources and couple with the spray drier assembly. The spray drier device may further transmit the received aerosolizing gas, drying gas, and plasma to the spray drier assembly. Spray drying of the plasma is performed in the spray drier assembly under the control of the spray drier device.

In certain embodiments, the spray drier assembly includes a sterile, hermetically sealed enclosure body and a frame to which the enclosure body is attached. The frame defines first, second, and third portions of the assembly, separated by respective transition zones. A drying gas inlet provided within the first portion of the assembly, adjacent to a first end of the enclosure body.

A spray drying head is further attached to the frame within the transition zone between the first and second portions of the assembly. This position also lies within the incipient flow path of the drying gas within the assembly. During spray drying, the spray drying head receives flows of an aerosolizing gas and plasma and aerosolizes the plasma with the aerosolizing gas to form an aerosolized plasma. Drying gas additionally passes through the spray drying head to mix with the aerosolized plasma within the second portion of the assembly for drying. In the second portion of the assembly, which functions as a drying chamber, contact between the aerosolized plasma and the drying gas causes moisture to move from the aerosolized plasma to the drying gas, producing dried plasma and humid drying gas.

In alternative embodiments, the aerosolizing gas may be omitted and the spray drier assembly head may include an aerosolizer that receives and atomizes the flow of plasma. Examples of the aerosolizer may include, but are not limited to, ultrasonic atomizing transducers, ultrasonic humidified transducers, and piezo-ultrasonic atomizers. Beneficially, such a configuration eliminates the need for an aerosolizing gas, simplifying the design of the spray drier device and assembly and lowering the cost of the spray drier system.

The spray drying head in an embodiment is adapted to direct the flow of drying gas within the drying chamber. For example, the spray drying head includes openings separated by fins which receive the flow of drying gas from the drying gas inlet. The orientation of the fins allows the drying gas to be directed in selected flow pathways (e.g., helical). Beneficially, by controlling the flow pathway of the drying gas, the path length over which the drying gas and aerosolized blood plasma are in contact within the drying chamber is increased, reducing the time to dry the plasma.

The dried plasma and humid drying gas subsequently flow into the third portion of assembly, which houses a collection chamber. In the collection chamber, the dried plasma is isolated from the humid drying gas and collected using a filter. For example, the filter in an embodiment is open on one side to receive the flow of humid air and dried plasma and closed on the remaining sides. The humid drying gas passes through the filter and is exhausted from the spray drier assembly.

In alternative embodiments, the filter is adapted to separate the collection chamber into two parts. The first part of the collection chamber is contiguous with the drying chamber and receives the flow of humid drying gas and dried plasma. The dried plasma is collected in this first part of the collection chamber, while the humid air passes through the filter and is exhausted from the spray drier assembly via an exhaust in fluid communication with the second part of the spray drier assembly.

After collecting the dried plasma, the collection chamber is separated from the spray drier assembly and hermetically sealed. In this manner, the sealed collection chamber is used to store the dried plasma until use. The collection chamber includes a plurality of ports allowing addition of water to the collection chamber for reconstitution of the blood plasma and removal of the reconstituted blood plasma for use. The collection chamber is further attached to a sealed vessel containing water for reconstitution.

When handling transfusion products, such as blood plasma, the transfusion products must not be exposed to any contaminants during collection, storage, and transfusion. Accordingly, the spray drier assembly, in an embodiment, is adapted for reversible coupling with the spray drier device. For example, the spray drier assembly is coupled to the spray drier device at about the drying gas inlet. Beneficially, so configured, the spray drier assembly accommodates repeated or single use. For example, in one embodiment, the spray drier assembly and spray drying head is formed from autoclavable materials (e.g., antibacterial steels, antibacterial alloys, etc.) that are sterilized prior to each spray drying operation. In an alternative embodiment, the spray drier head and spray drying chamber is formed from disposable materials (e.g., polymers) that are autoclaved prior to each spray drying operation and disposed of after each spray drying operation.

Reference will now be made to FIG. 1A, which schematically illustrates one embodiment of a spray drier system 100. The system 100 includes a spray drier device 102 configured to receive a spray drier assembly 104. A source of plasma 112, a source of aerosolizing gas 114, and a source of drying gas 116 are further in fluid communication with the spray drier assembly 104. During spray drying operations, a flow of the drying gas 116A is drawn within the body of the assembly 104. Concurrently, a flow of a blood plasma 112A and a flow of aerosolizing gas 114A are each drawn at selected, respective rates, to a spray drying head 104A of the assembly 104. In the spray drier assembly 104, the flow of blood plasma 112A is aerosolized in the spray drier head 104A and dried in a drying chamber 104B, producing a dried plasma that is collected and stored for future use in a collection chamber 104C. Waste water 122 removed from the blood plasma during the drying process is further collected for appropriate disposal.

The spray drier device 102 further includes a spray drier computing device 124. The spray drier computing device 124 is adapted to monitor and control a plurality of process parameters of the spray drying operation. The spray drier computing device 124 further includes a plurality of user interfaces. For example, one user interface may allow an operator to input data (e.g. operator information, liquid sample information, dried sample information, etc.), command functions (e.g., start, stop, etc.). Another user interface may display status information regarding components of the spray drier device (e.g., operating normally, replace, etc) and/or spray drying process information (e.g., ready, in-process, completed, error, etc.).

The spray drier device 102 is in further communication with a Middleware controller 150. The spray drier device 102 records one or more parameters associated with a spray drying operation. Examples of these parameters includes, but are not limited to, bibliographic information regarding the blood plasma which is spray dried (e.g., lot number, collection date, volume, etc.), bibliographic information regarding the spray drying operation (e.g., operator, date of spray drying, serial number of the spray drier assembly 104, volume of dried plasma, etc.), process parameters (e.g., flow rates, temperatures, etc.). Upon completion of a spray drying operation, the spray drier device 102 communicates with the middleware controller to transmit a selected portion or all the collected information to the middleware controller 150.

For example, a spray drying system 100 may be housed in a blood bank facility. The blood back facility receives regular blood donations for storage. Liquid plasma is separated from whole blood donations, dried using the spray drying system 100, and subsequently stored until use. The middleware controller 150 comprises one or more computing devices maintained by the blood bank for tracking stored, dried blood. Beneficially, by providing a spray drying system 100 capable of relaying information regarding dried plasma to a middleware controller 150 of the blood center in which it is housed, information regarding the stored blood is then automatically conveyed to the blood center.

Figure 1B:
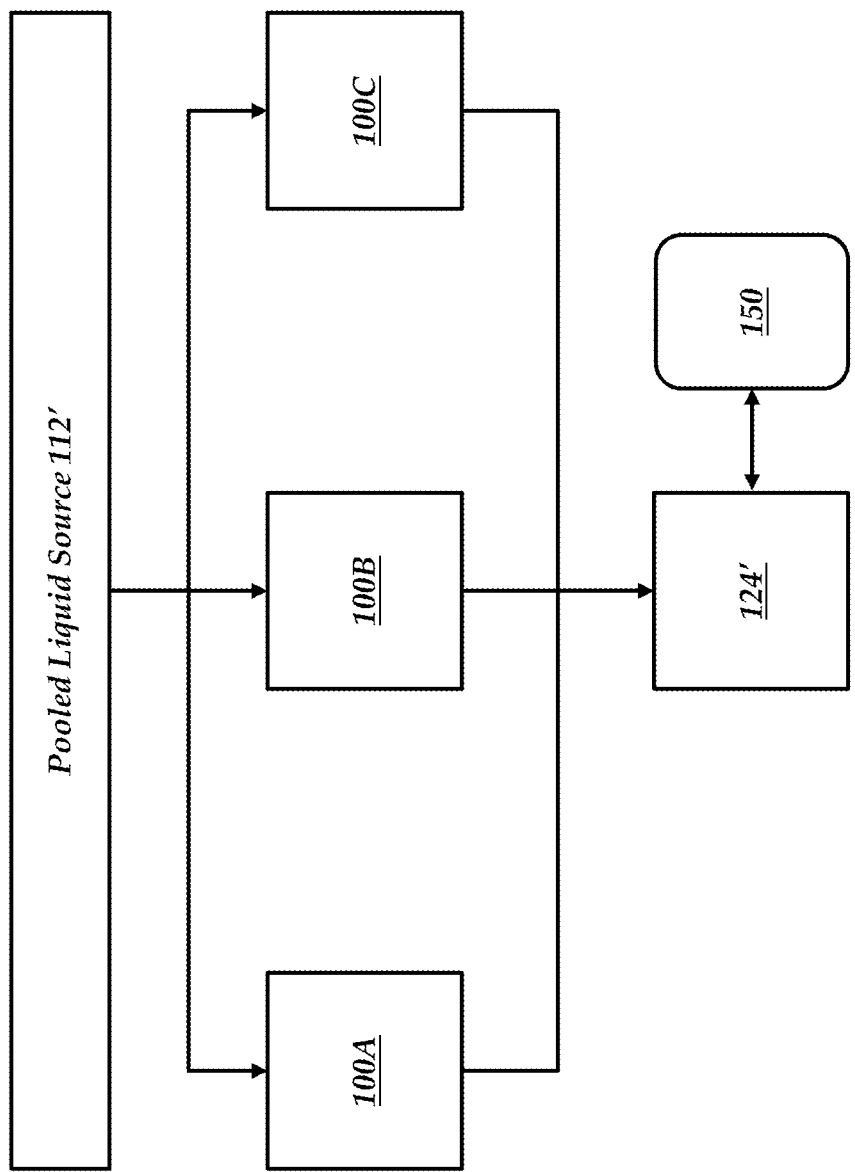
FIG. 1B is a schematic illustration of a plurality of the spray drier systems of FIG. 1A for use with a pooled liquid source.

In an alternative embodiment, illustrated in FIG. 1B, a plurality of spray drier systems 100A, 100B, . . . 100N can be used in combination with a pooled plasma source 112'. In general, the pooled plasma source 112' is a bulk source of blood plasma having a volume larger than one blood unit, as known in the art (e.g., approximately 1 pint or 450 mL). Two or more of the spray drier systems 100A, 100B, . . . 100N can operate concurrently, each drawing blood for spray drying from the pooled plasma source 112', rather than a smaller, local blood source.

The spray drier systems 100A, 100B, . . . 100N in a pooled environment can operate under the control of a computing device 124'. The computing device 124' is similar to computing device 124 discussed above, but adapted for concurrent control of each of the spray drier systems 100A, 100B, . . . 100N. The spray drier computing device 124' further communicates with a remote computing device 150, as also discussed above.

The use of a pooled plasma source 112', provides advantages over a smaller, local plasma source, such as plasma source 112. When pooled prior to drying, the pooled liquid plasma can be treated for pathogen inactivation with UV light, a chemical, and the like. The pooled liquid plasma is dried using one or more spray drying systems 100 of the present invention and then the dried plasma can be collect in a single collection chamber or a plurality of collection chambers. If the pooled plasma is dried for human transfusion, then each collection container can be configured with an attached rehydration solution. If the pooled plasma is to be used for fractionation purposes, then it is collected in a configured without the rehydration solution. Further embodiments of a spray drier device 102 for use with the disclosed spray drier assembly 104 may be found in U.S. patent application Ser. No. 13/952,541, filed on Jul. 26, 2013 and entitled "Automated Spray Drier," the entirety of which is hereby incorporated by reference.

Figure 2A:
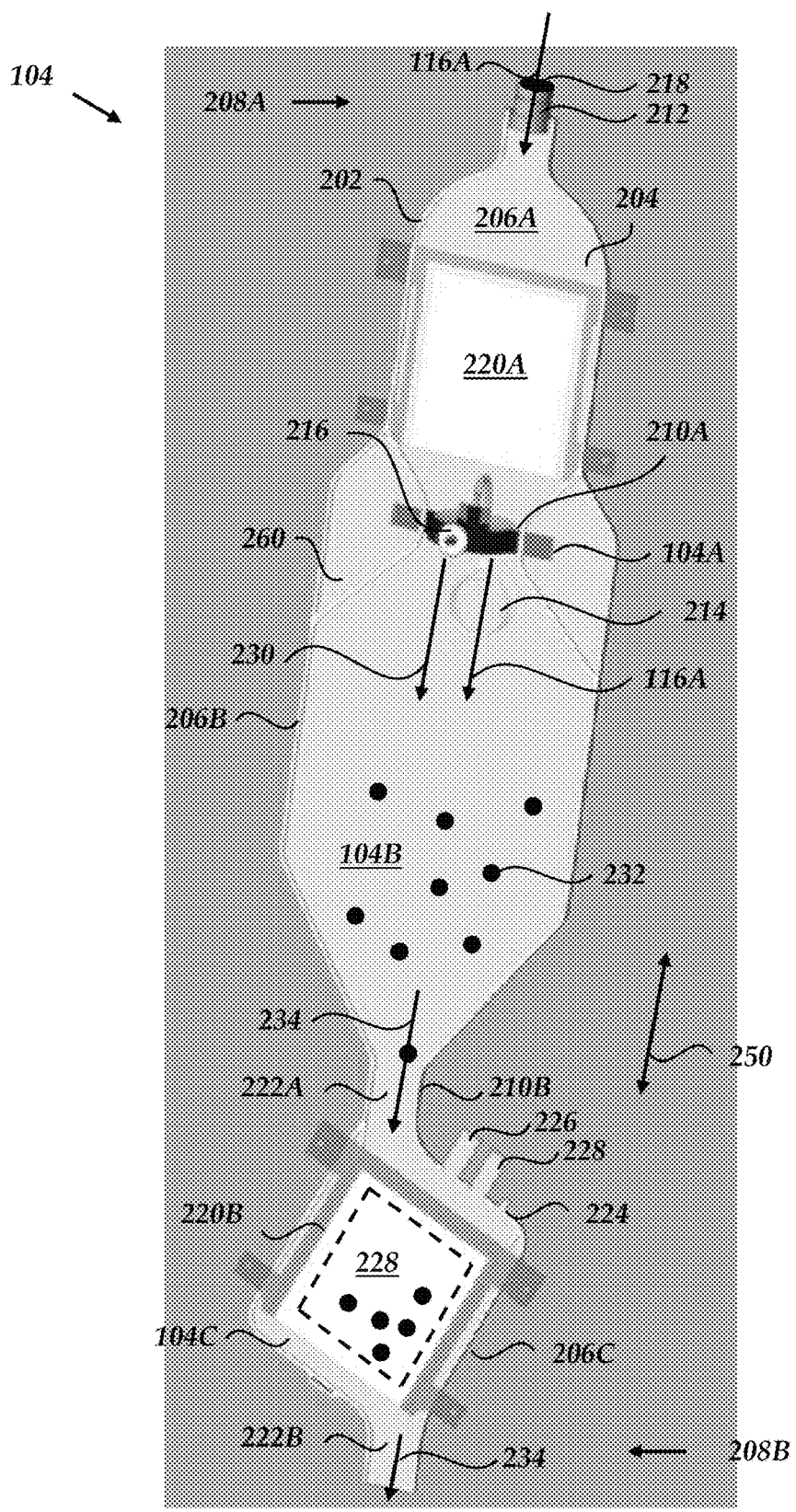
FIGS. 2A and 2B are schematic illustrations of the spray drier assembly of FIG. 1A.
Figure 2B:
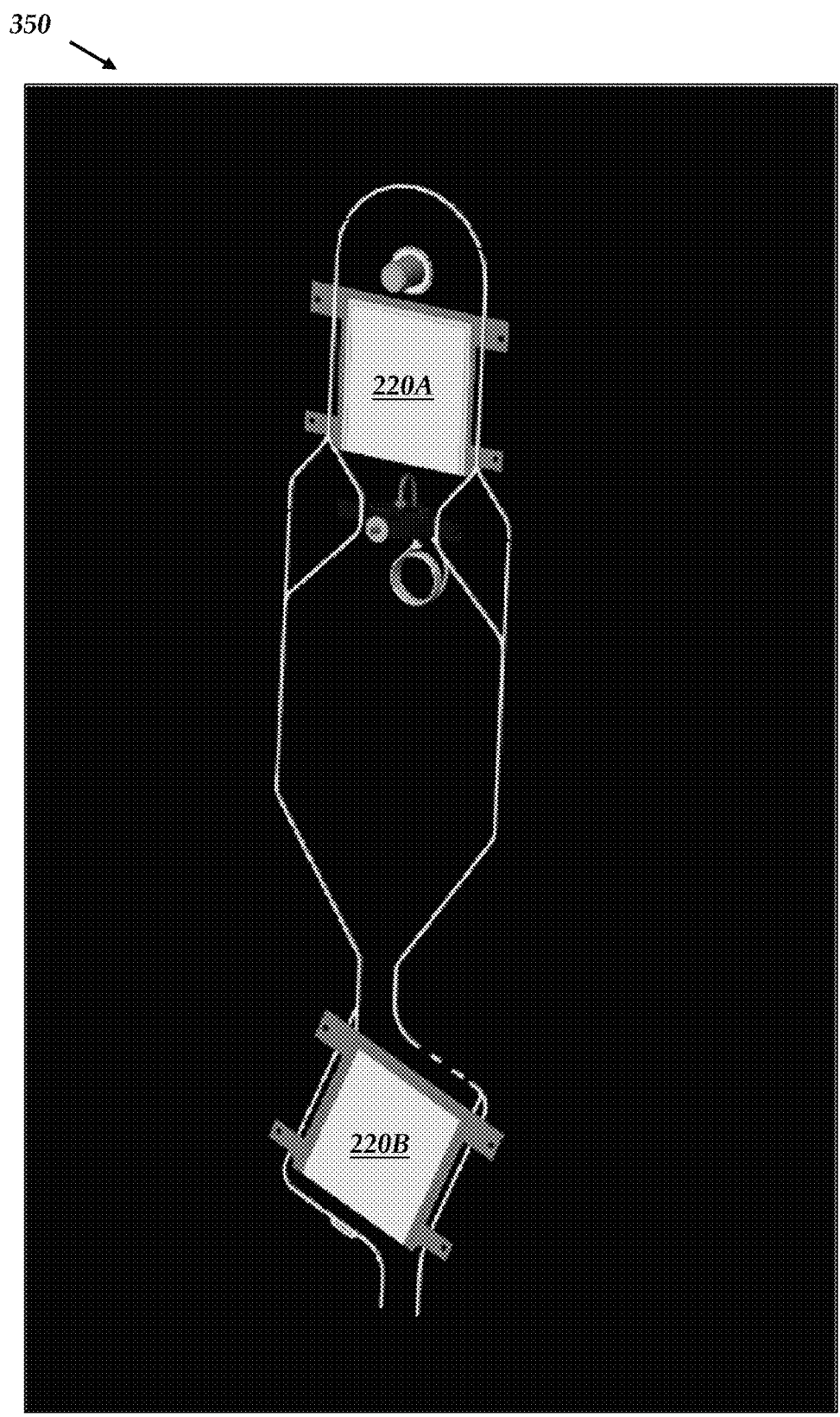

FIGS. 2A and 2B illustrate embodiments of the spray drier assembly 104 in greater detail. As illustrated in FIG. 2A, the spray drier assembly 104 includes a frame 202. An enclosure or body 204 having first and second ends 208A, 208B further extends about and encloses the frame 202. Thus, the body 204 adopts the shape of the frame 202. The enclosure 204 may further include a dual layer of film sealed together about the periphery of the frame 202.

In certain embodiments, the frame 202 may define a first portion 206A, a second portion 206B, and a third portion 206C of the assembly 104. The first portion of the assembly 206A is positioned adjacent the first end 208A of the body 204. The third portion of the assembly 206C is positioned adjacent to the second end 208B of the enclosure 204. The second portion of the assembly 206B is interposed between the first and third portions of the assembly 206A, 206C.

The frame 202 further defines first and second transition zones 210A, 210B between the first, second, and third portions of the assembly 206A, 206B, 206C. For example, the first transition zone 210A may be positioned between the first and second portions of the assembly 206A, 206B and the second transition zone 210B may be positioned between the second and third portions of the assembly 206B, 206C. In certain embodiments, the frame 202 may narrow in width, as compared to the width of the surrounding assembly within the transition zones 210A, and/or 210B. The relatively narrow transition zones 210A, 210B help to direct the flow of drying gas 116A through the assembly 202.

In further embodiments, the body 204 may include a drying gas inlet 212, adjacent to the first end 208A. The drying gas inlet 212 may be adapted to couple with the spray drier device 102 to form a hermetic and sterile connection that allows the flow of drying gas 116A to enter the assembly 104. In one embodiment, illustrated in FIG. 2A, the drying gas inlet 212 is positioned within the first portion of the assembly 206A, at about the terminus of the first end of the body 208A. In this configuration, the flow of drying gas 116A is received within the assembly 104 in a direction approximately parallel to a long axis 250 of the assembly 104.

In an alternative embodiment, illustrated in FIG. 2B, the body 204 may include a drying gas inlet 212'. The position of the drying gas inlet 212' is moved with respect to drying gas inlet 212. For example, the drying gas inlet 212' may be positioned within the first portion of the assembly 206A and spaced a selected distance from the terminus of the first end of the enclosure 208A. In this configuration, the flow of drying gas 116A may be received within the assembly 104 in a direction that is not parallel to the long axis 250 of the assembly 104. For example, in a non-limiting embodiment, the flow of drying gas 116A is received within the assembly 104 in a direction that is approximately perpendicular to the long axis 250 of the assembly 104.

In certain embodiments, the spray drier assembly 104 may further include a removable cover 218. The cover 218 may be employed prior to coupling of the spray drier assembly 104 with the spray drier device 102 in order to inhibit contaminants from entering the spray drier assembly. In certain embodiments, the cover 218 may be removed immediately prior to coupling with the spray drier device 102 or frangible and penetrated by the spray drier device 102 during coupling with the spray drier assembly 104.

The drying gas 116A received by the assembly 104 is urged to travel from the first portion 206A, through the second portion 206B, to the third portion 206C, where it is removed from the assembly 104. As the drying gas 116A travels within the first portion of the assembly 206A towards the second portion of the assembly 206B, the drying gas 116A passes through a first filter 220A which filters the drying gas 116A entering the assembly 104 in addition to any filtering taking place within the spray drier device 102 between the drying gas source 116 and the drying gas inlet 212. In certain embodiments, the first filter 220A is a 0.2 micron filter having a minimum BFE of $10^6$. The filter 220A further helps to ensure the cleanliness of the flow of drying gas 116A.

This process of drying the plasma as it travels through the spray drier assembly 104 may be referred to herein as primary drying. Secondary drying, which further removes moisture from the dried plasma 230 collected within the collection chamber 104C, is discussed in greater detail below. In another embodiment, the flows of aerosolizing gas 114A and/or drying gas 116A used during primary and/or secondary drying can be supplied by a plurality of heating devices in thermal communication with the spray drier assembly 104. Examples of the heating devices may include, but are not limited to, devices that employ energy such as electromagnetic, radiofrequency, radiation, microwaves for heating. In this manner, the plurality of heating devices may emit electro-magnetic radiation that passes through the walls of the drying chamber 104B, the collection chamber 104C, or both for heating the flows of aerosolizing gas 114A and/or drying gas 116A therein.

In an embodiment, during primary drying, the flow of drying gas 116A received by the spray drier assembly 104 may possess a temperature between about 50° C. and about 150° C. and a flow rate of between about 15 CFM to about 35 CFM. The flow of aerosolizing gas 116A can possess a flow rate of between about 5 L/min and about 20 L/min and a temperature between about 15° C. to about 30° C. (e.g., 24° C.). The flow of liquid sample 112A may possess a flow rate of between about 3 ml/min to about 20 ml/min. As the plasma is dried, the flow of the aerosolizing gas 114A, the flow of drying gas 116C, or both may direct the flow of the dried sample 230 through at least a portion of the spray drier assembly 104 (e.g., the drying chamber, the collection chamber, or both).

In an embodiment, the assembly 104 may further include a spray drying head 104A, a drying chamber 104B, and a collection chamber 104C in fluid communication with one another. The spray drying head 104A may be mounted to the frame 202 and positioned within the first transition zone 210A. So positioned, the spray drying head 104A is also positioned within the flow of drying gas 116A traveling from the first portion of the assembly 206A to the second portion of the assembly 206B. The spray drying head 104A may be further adapted to receive the flow of plasma 112A and the flow of aerosolizing gas 114A through respective feed lines 214, 216 and output aerosolized plasma 230 to the drying chamber 104B.

In further embodiments, the drying chamber 104B and collection chamber 104C may be positioned within the second and third portions of the assembly 206B, 206C, respectively. The drying chamber 104B inflates under the pressure of the flow of drying gas 116A and provides space for the aerosolized blood plasma 230 and the flow of drying gas 116A to contact one another. Within the drying chamber 104B, moisture is transferred from the aerosolized blood plasma 230 to the drying gas 116A (i.e., primary drying), where the drying gas 116A becomes humid drying gas 234. The aerosolized flow of blood plasma 230 and the flow of drying gas 116A are further separated, within the drying chamber 104B, into dried plasma 232 and humid drying gas 234. In certain embodiments, the dried plasma 232 may possess a mean diameter of less than or equal to 25 µm.

The humid air 234 and dried plasma 232 are further drawn into the collection chamber 104C through an inlet port 222A of the collection chamber 104C, positioned within the second transition zone 210B, connecting the collection chamber 104C and the drying chamber 104B. The collection chamber 104 includes a second filter 220B which allows through-passage of the humid gas 234 and inhibits through-passage of the dried plasma 232. As a result, the humid gas 234 passing through the filter 220B is separated from the dried plasma 232 and exhausted from the collection bag 104C through an exhaust port 222B of the collection chamber 104C that forms the second end 208B of the body 204. For example, a vacuum source (e.g., a vacuum pump) may be in fluid communication with the exhaust port 222B of the collection chamber 104C to urge the humid gas 234 through exhaust port 222B. Concurrently, the dried plasma 232 is retained in a reservoir 228 of the collection chamber 104C. The collection chamber 104C is subsequently hermetically sealed at about the inlet and exhaust ports 222A, 222B, and detached (e.g., cut) from the spray drier assembly 104, allowing the collection chamber 104C to subsequently function as a storage vessel for the dried plasma 232 until use.

Figure 7A:
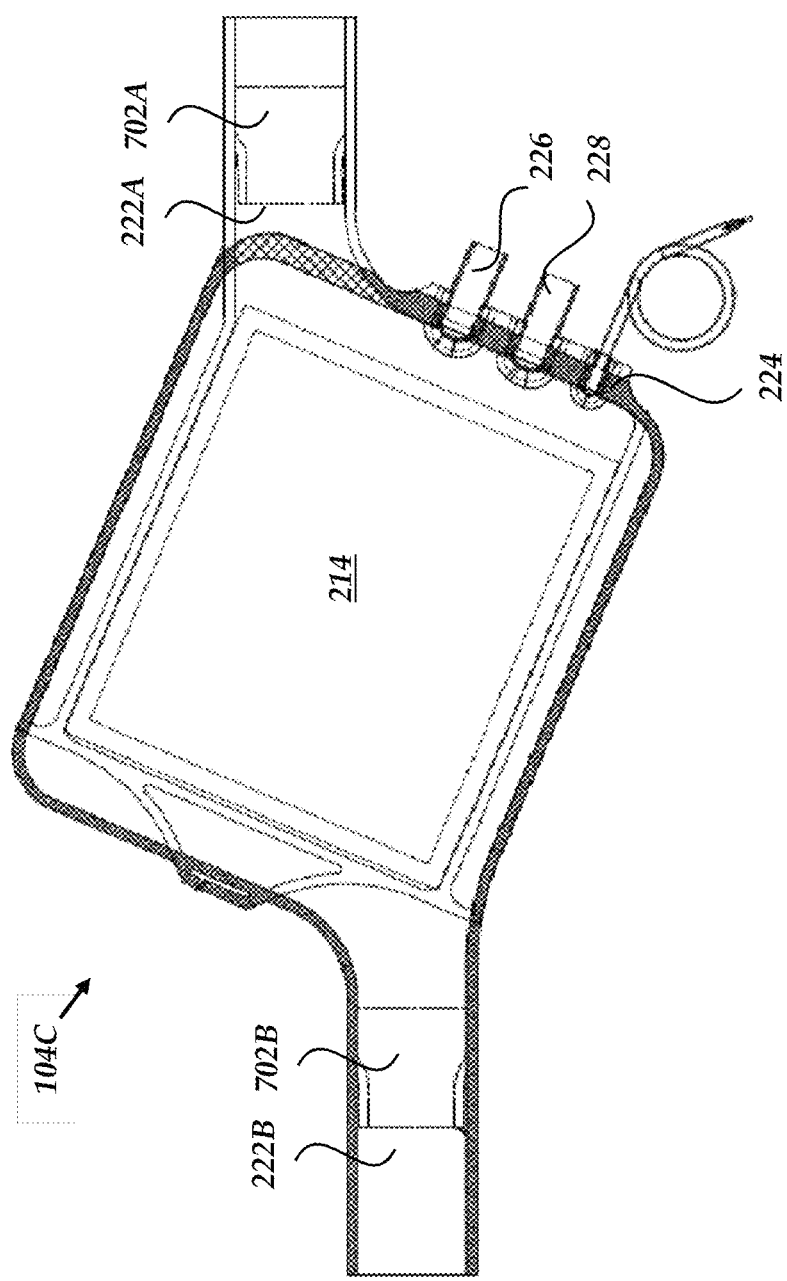
FIG. 7A-7B are schematic illustrations detailing embodiments of a collection chamber of the spray drier assembly of FIGS. 2A-2B.

With reference to FIG. 7A, the collection chamber 104C further includes a plurality of one-way valves 702A, 702B positioned at about the inlet port 222A and the exhaust port 222B, respectively. The one-way valve 702A may function to permit gas flow from the drying chamber 104B to the collection chamber 104C and inhibit gas flow from the collection chamber 104C to the drying chamber 104B. The one-way valve 702B may function to permit gas flow from the collection chamber 104C while inhibiting gas flow into the collection chamber 104C via the exhaust port 222B.

In a further embodiment, if desired, secondary drying can be performed in the collection chamber 104C by maintaining the flow of drying gas 116A across the dried plasma 232 once it has been collected in the collection chamber 104C. In the case of secondary drying, some of the parameters for flow rates and temperatures of the drying gas can be changed from those specified above for primary drying. For example, the flow of drying gas 116A my possess a temperature between about 35° C. and about 80° C. and a flow rate of between about 10 CFM to about 35 CFM. The flow of aerosolizing gas 114A can possess a flow rate of between about 0 L/min and about 20 L/min and a temperature between about 15° C. to about 30° C. (e.g., 24° C.).

The collection chamber 104C may be further configured for use in rehydrating the dried plasma 232. For example, the collection chamber 104C may include a rehydration port 224, a plurality of spike ports 226, and a vent port 228. The rehydration port 224 may be used to communicate with a source of rehydration solution, allowing the rehydration solution to come in contact with the dried plasma 232 within the collection chamber 104C to form reconstituted plasma. The reconstituted plasma may be subsequently drawn from the collection chamber 104C through the spike ports 226.

Vent port 228 may adapted to allow venting of the flow of humid drying gas 234 during secondary drying. For example, in certain embodiments, during primary drying, the vents 702A, 702B may allow for gas flow as discussed above and the vent port 228 may be closed. During secondary drying, after primary drying is completed, the vents 702A, 702B may be sealed and the vent port 228 opened. The vent port 228 may be further placed in fluid communication with a vacuum source (e.g., a vacuum pump) for secondary drying. The vacuum source may be In further embodiments, a filter (e.g., 0.22 μm or better) may be inline with the vent port 228.

Figure 7B:
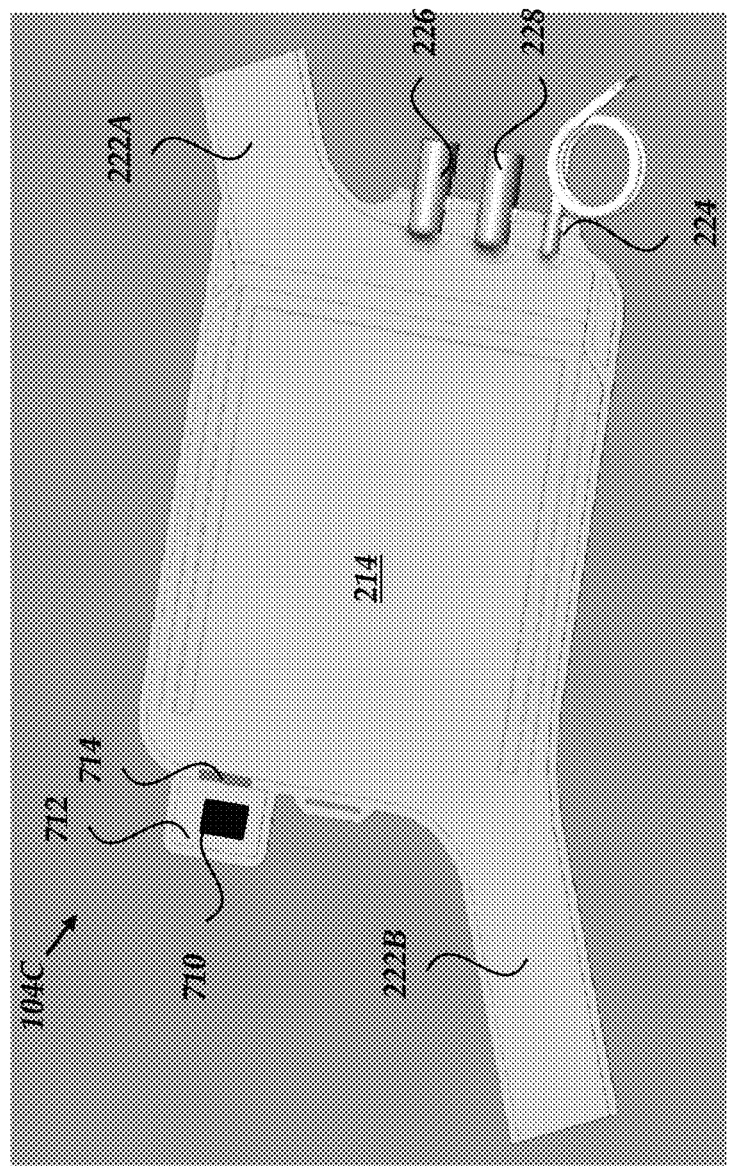

In yet another embodiment, illustrated in FIG. 7B, a desiccant 710 can be placed within a pouch or tube 712 of the collection chamber 104C to facilitate drying. For example, the desiccant or similar substance can be placed in contact with the dried sample. In another example, the desiccant or similar substance is not placed in contact with the dried plasma but rather in fluid communication with the dried plasma (e.g., on either side of the filter within the collection chamber 104C, in a separate pocket or port). For example, a breakable seal 714 may be interposed between the pouch and the remainder of the collection chamber 104C, allowing a user to bring the desiccant 710 into fluid communication with the dried plasma when desired (e.g., after the collection chamber 104C has been sealed and removed from the spray drier assembly 104). Beneficially, use of desiccant 710 within the collection chamber 104C may allow for further moisture removal from the dried plasma over the duration of storage and increase the shelf-life of the dried plasma.

Figure 3A:
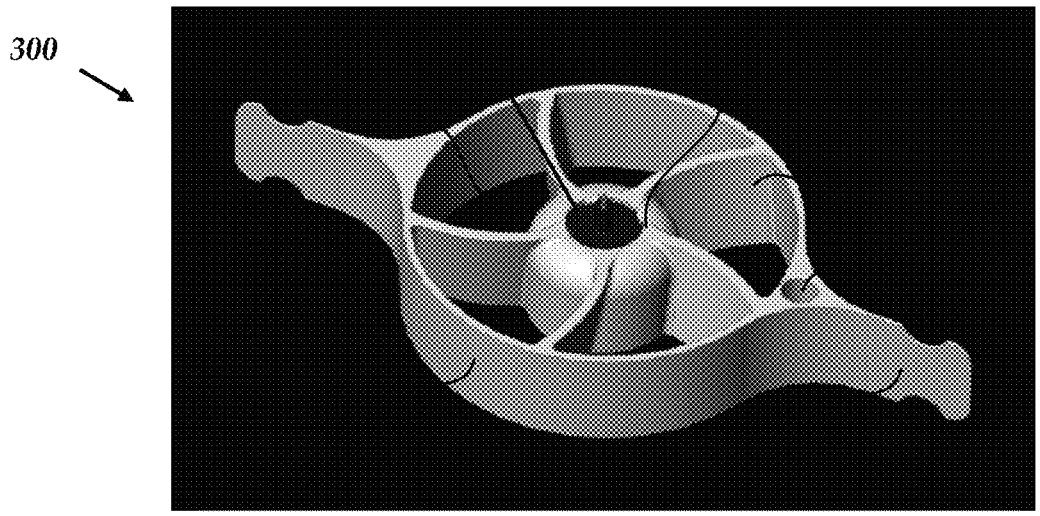
FIGS. 3A-3B are perspective and cut-away views of embodiments of a spray drying head of the spray drier assembly of FIGS. 2A-2B.

The spray drying head 104A will now be discussed in further detail with respect to the embodiments of FIGS. 3A-3B. A spray drying head 300 includes a body 302 having an outer wall 302A and a center portion 302B. The body 302 further includes a plurality of tabs 310 extending outwards from the body 300. The tabs 310 may be adapted secure the spray drying head 300 to the frame 202 by a weld or other securing mechanism.

In an embodiment, a plurality of fins 304 extend between the outer wall 302A and center portion 302B, defining openings 306 there-between, which extend through the thickness of the spray drying head 104A. The openings 306 provide passageways for drying gas 116A impinging the drying head 104A to pass through the drying head 104A. As discussed in greater detail below, the plurality of fins 304 may further direct the flow path of the flow of drying gas 116A into the drying chamber 104B.

In certain embodiments, the outer wall 302A and center portion 302B are concentric. In further embodiments, the outer wall 302A and center portion 302B are generally circular. However, it may be understood that embodiments of the spray drying head 300 may adopt any shape capable of performing the functions of the spray drying head 300, as necessary.

Figure 3B:
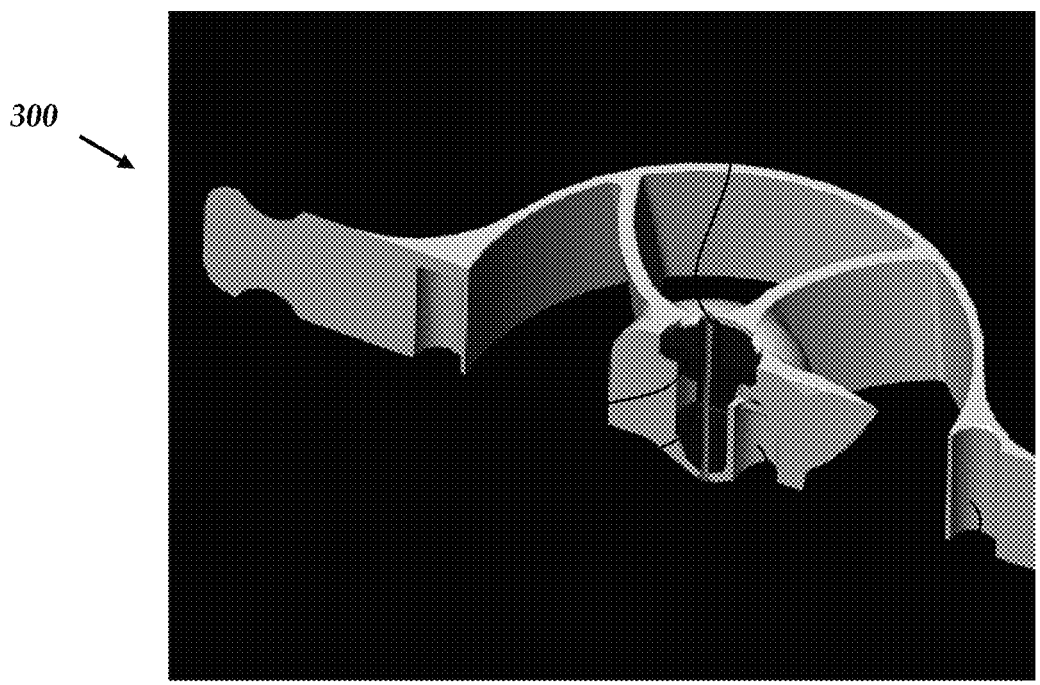

The spray drying head 300 is further illustrated in FIG. 3B in cut-away. The center portion 302B includes a nozzle 308 having a plasma inlet 312 adapted to couple with the plasma feed line 214 and direct the flow of plasma to a distal nozzle tip 314. An aerosol gas tubing support 316 is further provided for supporting the aerosol feed line 216. The terminus of the aerosol feed line 216 is received at an aerosol gas inlet port 320 in communication with an annular opening 322. The flow of aerosolizing gas 114A passes through the annular opening 322 and exits the spray drying head at the distal nozzle tip 314. So configured, the flow of plasma 112A and flow of aerosolizing gas 116A meet as each exits the distal nozzle tip 314 to form aerosolized plasma 230. In an embodiment, the aerosolized plasma 230 is directed parallel to the axis 250. So configured, the plasma inlet 312 and the aerosol gas inlet port 320 may each be positioned within the spray drier assembly body 304.

Figure 4B:
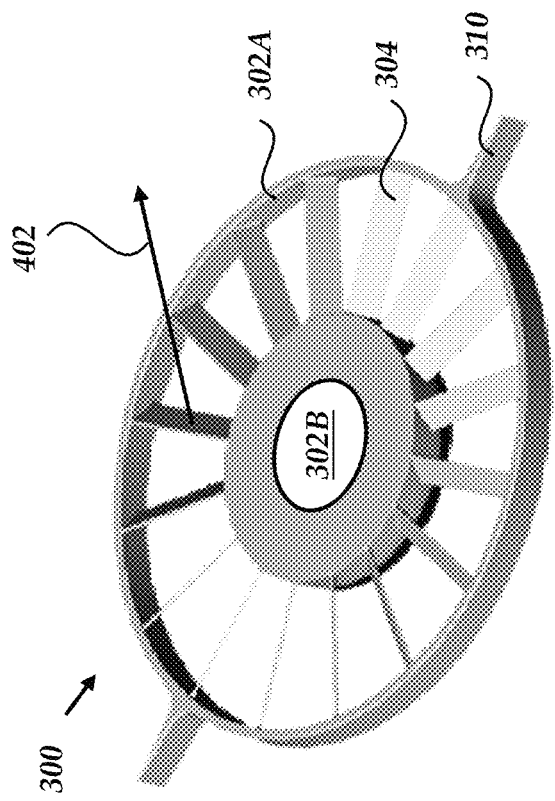
FIGS. 4A-4B are schematic illustrations of embodiments of additional fin configurations for embodiments of the spray drier assembly head.
Figure 4A:
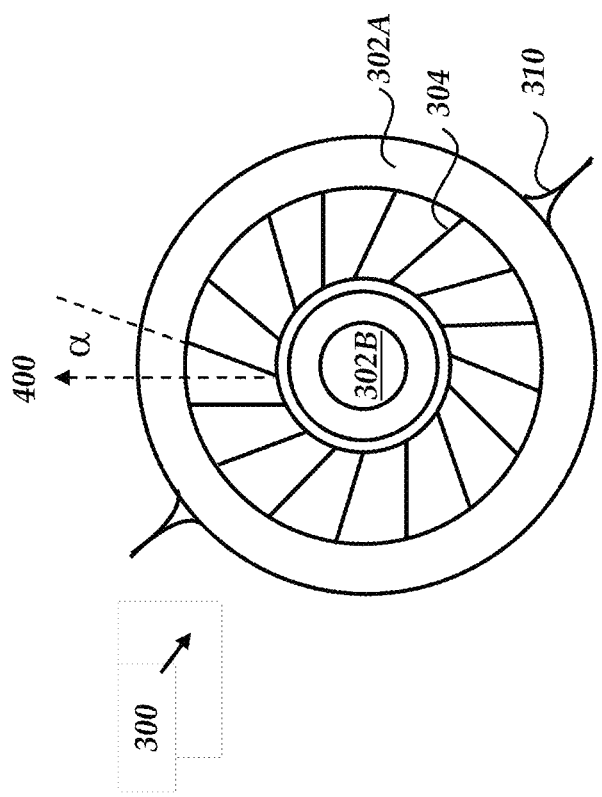

In certain embodiments, the plurality of fins 304 extend radially outwards from the center portion 302B of the spray drying head 300. FIGS. 4A and 4B illustrate alternative embodiments of configurations of the plurality of fins 304. For example, as illustrated in FIG. 4A, the plurality of fins 304 may extend outward from the center of the frame 302B at a selected angle α with respect to a surface normal 400 extending from the frame center 302B in the plane of the head 300. In certain embodiments, angle α may range between about 20 degrees to about 60 degrees, preferably about 45 degrees. In other embodiments, illustrated in FIG. 4B, the plurality of fins 304 are tilted such that a surface normal 402 to the plane of each of the plurality of fins 304 points out of the plane of the spray drying head 300.

By adjusting the orientation of the plurality of fins 304, the spray drying head 300 modifies the laminar flow of the drying gas 116A passing there-through to create a helical flow path. The helical flow path may possess any number of rotations. For example, the drying gas 116A may be directed in a helical flow path having a selected number of revolutions through the length of the drying chamber 104B (e.g., ¼ revolution, 1 revolution, 5 revolutions, 15 revolutions, 25 revolutions, etc.).

Directing the drying gas 116A in a helical flow path is believed to provide benefits to the spray drying process. For example, in an embodiment the helical flow path may increase the length of contact between the spray drying gas 116A and the aerosolized liquid sample 230 (e.g., aerosolized blood plasma). The increased length of contact may reduce the time required to achieve a given level of dryness in the resultant dried plasma 232.

Figure 5A:
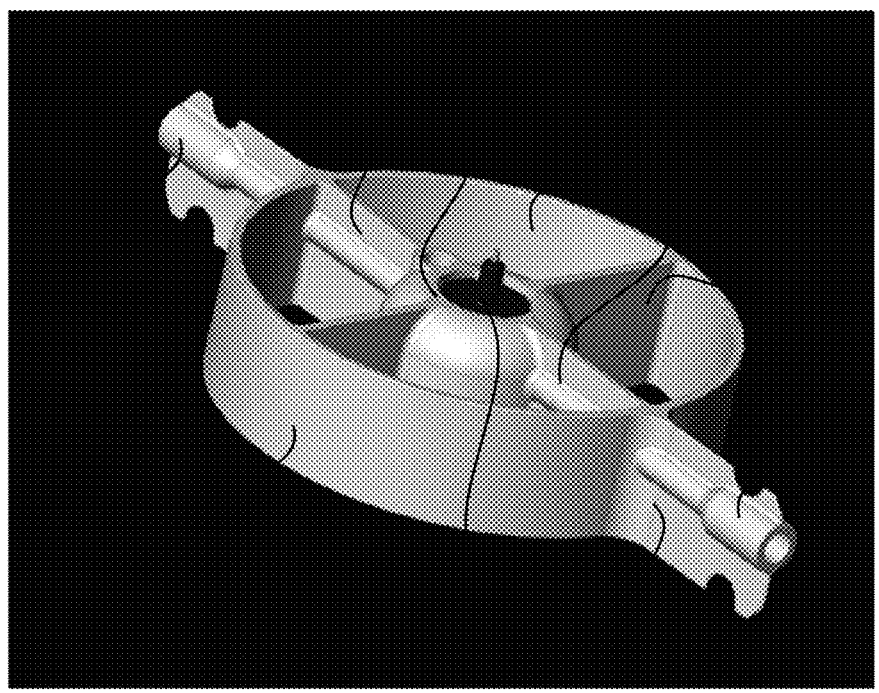
FIGS. 5A-5B are perspective and cut-away views of an alternative embodiment of the spray drier assembly head.
Figure 5B:
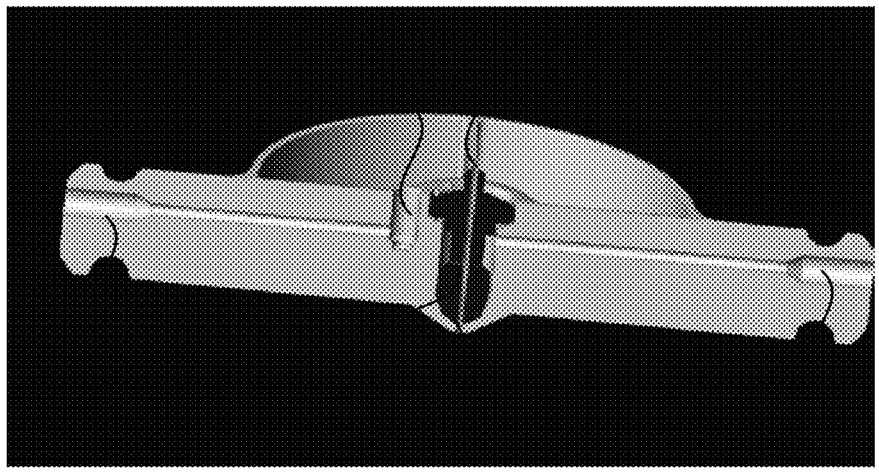

An alternative embodiment of the spray drying head 300 is illustrated in FIGS. 5A-5B. The spray drying head 500 differs from spray drying head 300 with the addition of integrated inlet ports for both the flow of plasma 112A and aerosolizing gas 114A to the spray drying head 500. The head body 302 and nozzle 308 remain otherwise unchanged. A plasma manifold 502 is provided to couple with the plasma feed line 214 to deliver the flow of plasma 112A to the nozzle 308. The plasma manifold 502 is further in fluid communication with a plasma port 506. An inner plasma feed line (not shown) connects the plasma port 506 with an inner plasma feed line attachment point 510, similar to plasma inlet 312. An aerosol manifold 512 is further adapted to communicate with aerosol gas feed line 216 to deliver the flow of aerosolizing gas 114A to the nozzle 308. The flow of aerosolizing gas 114A passes through the annular opening 322 and exits the spray drying head at the distal nozzle tip 314. So configured, the flow of plasma 112A and flow of aerosolizing gas 116A meet as each exits the distal nozzle tip 314 to form aerosolized plasma 230. In an embodiment, the aerosolized plasma 230 is directed parallel to the axis 250.

The embodiment of the spray drier head 500 may help to further maintain a sterile environment within the spray drier assembly 104. Connection points, such as the plasma manifold 502 and the aerosolizing gas manifold 512 provide possible points of entry for contaminants into the spray drying assembly 104. However, in the embodiment of spray drier head 500, when the head 500 is secured in place to the frame 202, the plasma manifold 502 and the aerosolizing gas manifold 512 are positioned outside of the first transition zone 210A in a region 260 of the spray drier body 202. The region 260 of the spray drier body may be hermetically sealed from the first, second, and third portions of the spray drier body 206A, 206B, 206C. Accordingly, any contaminants which collect on the plasma manifold 502 and the aerosolizing gas manifold 512 may be isolated from the flows of liquid sample 112A, aerosolizing gas 114A, and drying gas 116A.

As a result, the need to draw the plasma feed line 214 and aerosolizing gas feed line 216 into the spray drier assembly 104 within the first or second portion 206A, 206B may be eliminated. Rather, the plasma feed line 214 and aerosolizing gas feed line 216 may be drawn into the spray drier assembly 104 within a region 260 of the spray drier assembly.

FIG. 6 is a schematic illustration of a further embodiment of a nozzle 600 which is adapted to aerosolize a flow of liquid sample 112A without use of an aerosolizing gas. The nozzle 600 includes a channel 602 for conveying the flow of plasma 112A to a distal tip 604 including an ultrasonic transducer. The ultrasonic transducer receives electrical input which is converted into vibratory motion. The transducer may be an ultrasonic atomizing transducer, an ultrasonic humidified transducer, or a piezo-electric ultrasonic atomizer. The wavelength and frequency of the vibrational motion causes the flow of liquid sample 112A conveyed to the tip 604 to form standing waves 606. When the vibrational amplitude of the tip 604 is appropriately selected, the plasma is ripped apart such that chunks of fluid, i.e., aerosolized plasma 230, are formed. Beneficially, by removing the need for use of an aerosolizing gas, the spray drying head 104A and spray drier device 102 are simplified, reducing the cost of the spray drier device 102 and assembly 104.

Figure 8B:
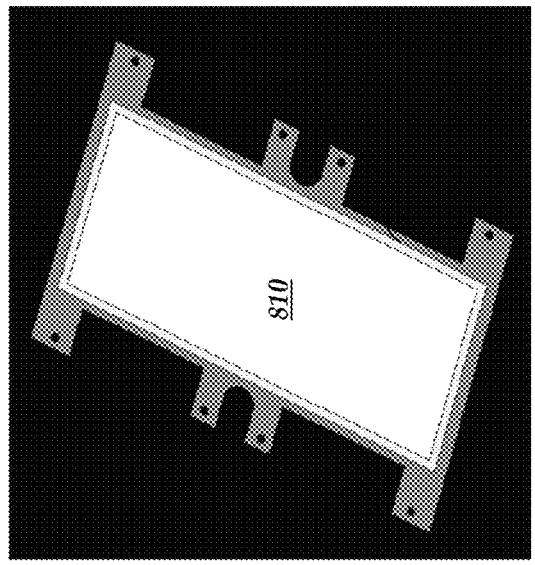
FIGS. 8A-8D are schematic illustrations of an embodiment of a filter of the spray drier assembly of FIGS. 2A-2B.
Figure 8D:
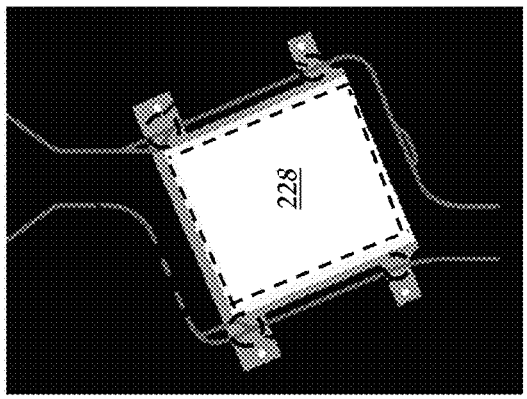
Figure 8A:
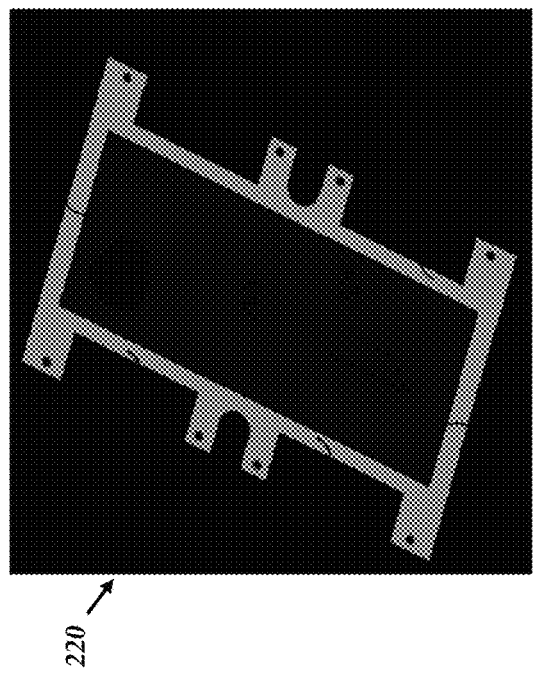

The discussion will now turn to the filters 220A, 220B. In certain embodiments, the filters 220A, 220B may be constructed in the same manner. One example of a filter bag design which may be employed for both filters 220A and 220B (collectively 220) is illustrated in FIGS. 8A-8D. The filter 220 may include a filter frame 802 having first opposing edges 804A and second opposing edges 804B. The edges 804A, 804B may be contiguous and define an opening 806 (FIG. 8A). A filter member 810 may be positioned within the opening 806 and secured to the frame 802 (e.g., filter-frame weld zone 812) or other mechanism for forming a hermetic seal between the filter member 810 and the frame 802 along the opposing edges 804A (FIG. 8B). In certain embodiments, the filter member 810 may be a 0.2 μm filter having a minimum BFE of $10^6$.

Figure 8C:
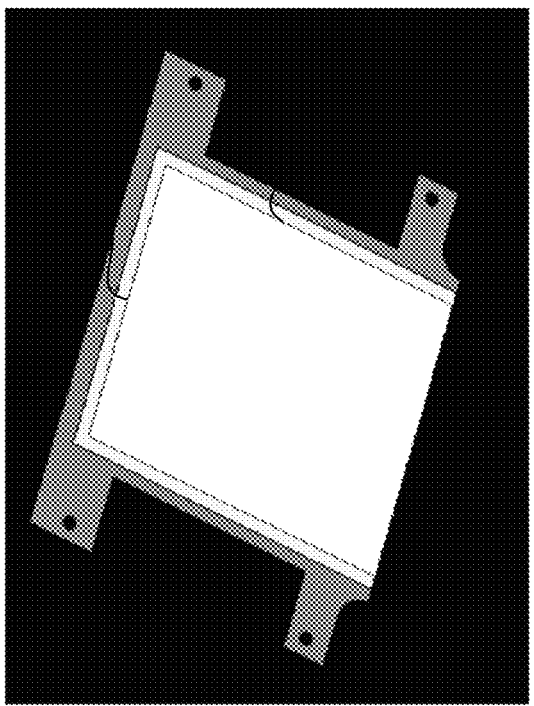

As further illustrated in FIG. 8C, a fold 814 is introduced into the frame 802. In certain embodiments, the fold 814 is positioned at approximately the middle of a long axis of the frame 808. In other embodiments, the fold 814 is offset from this midpoint, as necessary. The portions of the frame 802 on each side of the fold 814 are urged together such that the first edges 804A are brought into contact with each other. The first edges 804A are further hermetically sealed together by a weld (e.g., filter-filter weld zone 816) or other mechanism for hermetically sealing surfaces together. The second opposing edges 804B remain unsealed from each other. This arrangement provides a filter 220 with a filter mouth 820 adjacent to the second edges 804B.

When the filter 220 is employed as the first filter 220A, it is mounted to the frame 202 within the first portion of the assembly 206A at supports 822. The flow of drying gas 116A entering the first portion of the assembly 206A from the drying gas inlet 212, enters the filter mouth 820 and exit through the filter member 810. Contaminants within the flow of drying gas 116A that are unable to pass through the filter member 810 are retained by the filter 220A.

Similarly, when the filter 220 is employed as the second filter 220B, it is mounted to the frame 202 within the third portion of the assembly 206C at supports 822. The flow of dried plasma particles 232 and humid gas 234 entering the collection chamber 104C, enter the filter 220B through the mouth 820. The dried plasma particles 232 are inhibited from passing through the filter member 810, allowing the filter member 810 to store the dried plasma particles 232 within the reservoir 228 defined by the fold 814 and sealed, opposing edges 804A of the filter frame 802.

Figure 8E:
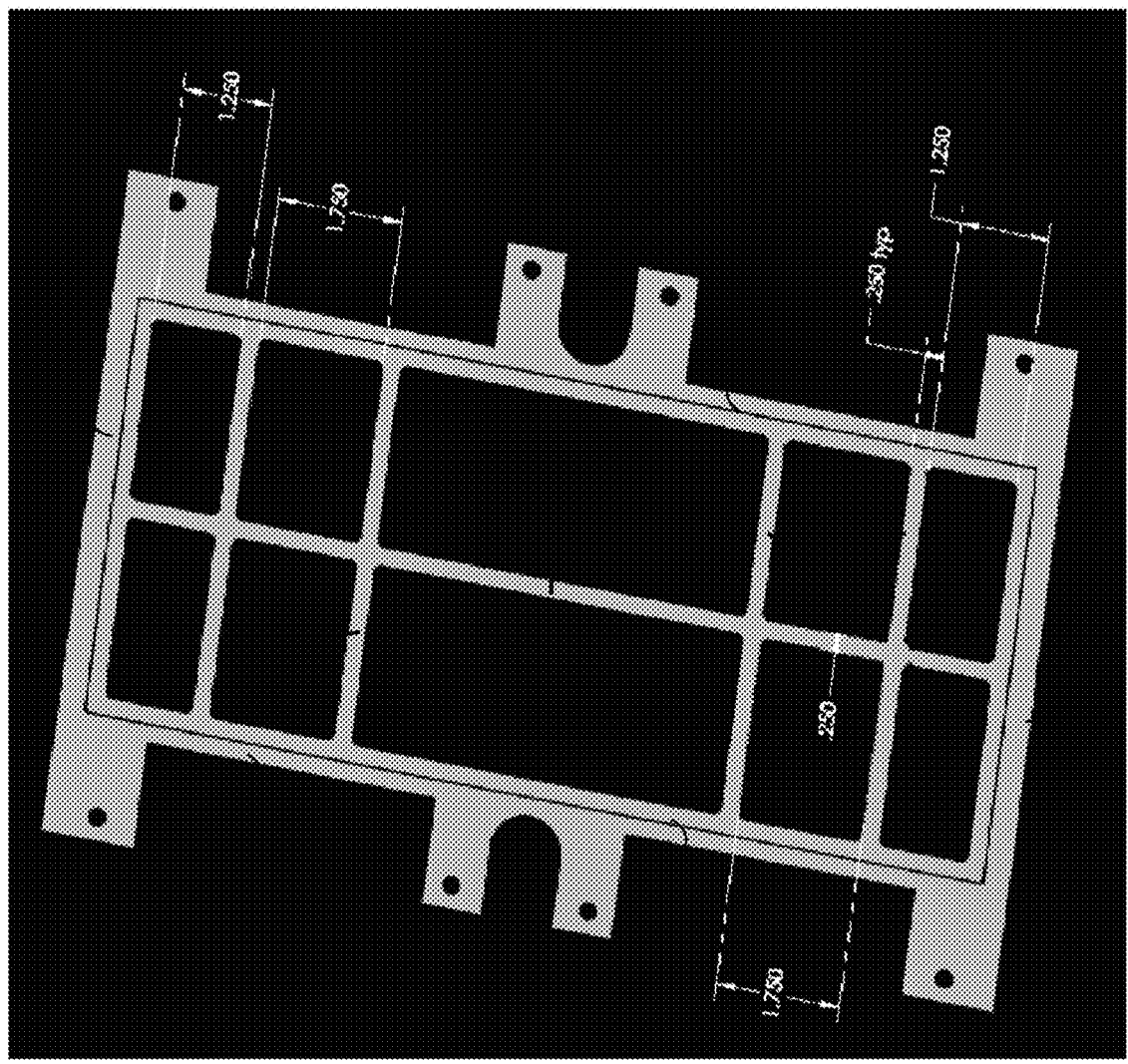
FIG. 8E is a schematic illustration of an alternative embodiment of a filter frame for use in the filter of FIGS. 8A-8D.

In an alternative embodiment, illustrated in FIG. 8E, the filter 220 is formed from a frame 850. The frame 850 is similar to frame 802 discussed above, with the addition of a first and second plurality of ribs 852, 854 spanning the opening. Beneficially, the first and second plurality of ribs 852, 854 provide additional support to the filter member 810 and act to inhibit rupture of the filter member 810 during spray drying operations.

The first plurality of ribs 852 may span the shortest spaced opposing sides of the frame 850 (e.g., sides 804A), while the second plurality of ribs 854 may span the longest spaced opposing sides of the frame 850 (e.g., sides 804B). For example, as illustrated in FIG. 8E, four of the first plurality of ribs 852 and one of the second plurality of ribs 854 is provided. However, it may be understood that greater or fewer of first and second plurality of ribs 852, 854 may be employed in the frame 850, as necessary. The filter 220 is otherwise formed from frame 850 as discussed above with respect to frame 802.

Figure 9A:
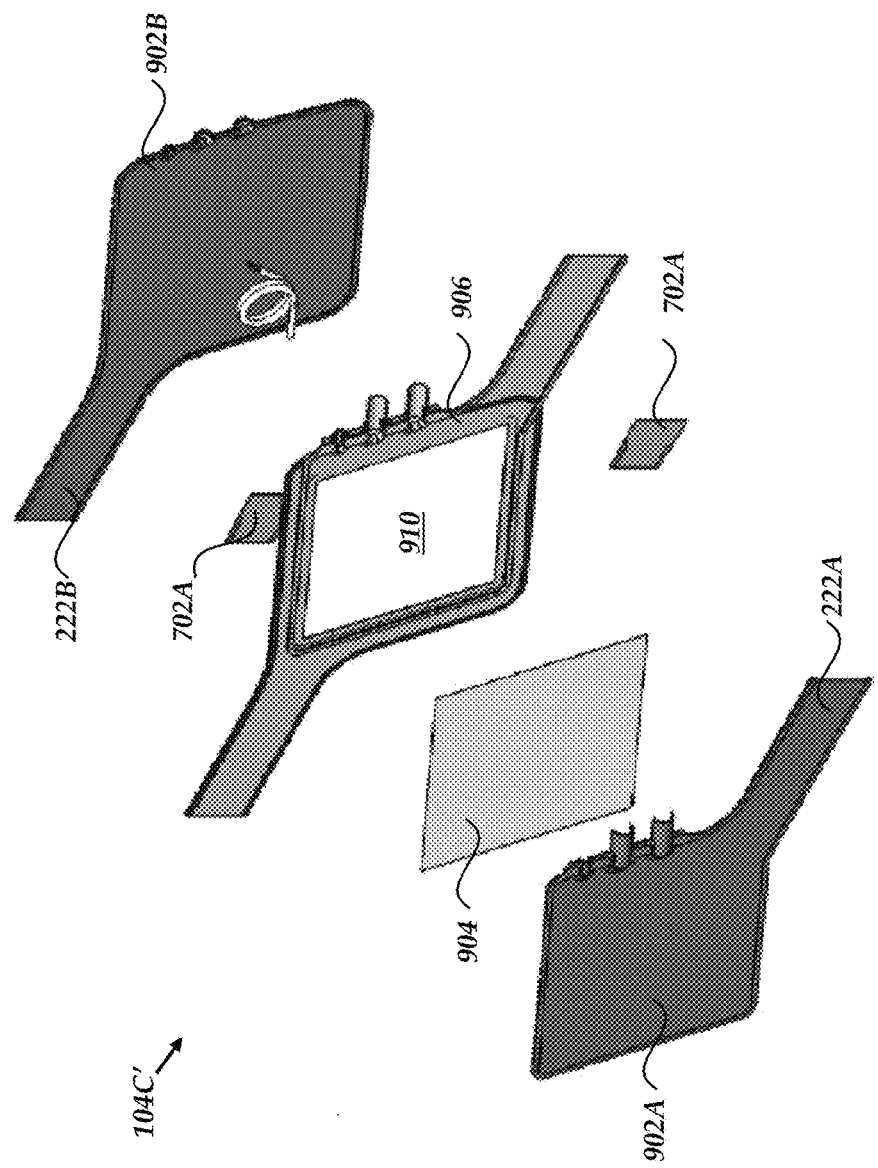
FIGS. 9A-9B is a schematic illustration of a first alternative embodiment of the collection chamber of FIGS. 2A-2B.
Figure 9B:
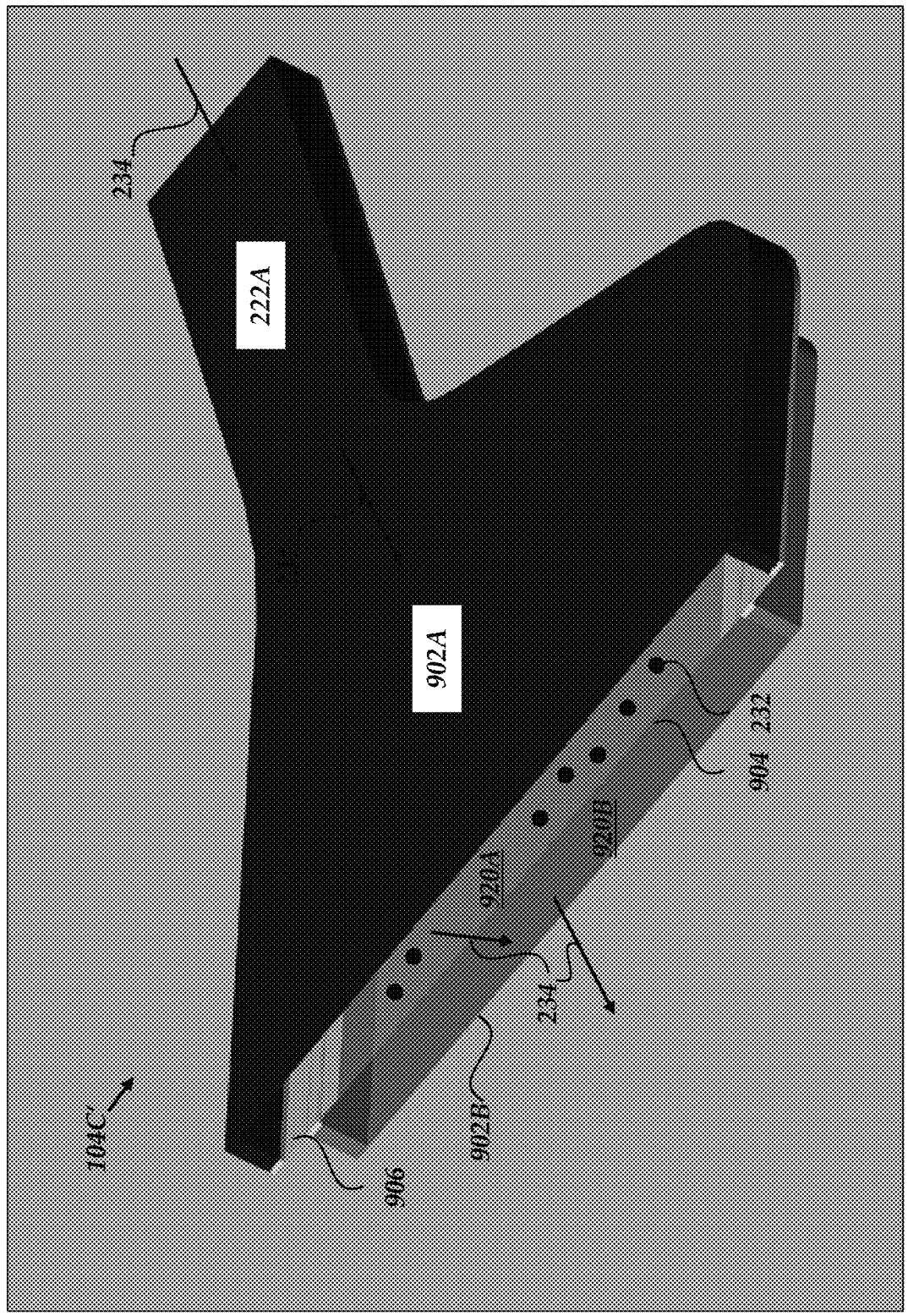

In other embodiments, the filter 222B is different than the filter 220 discussed above. In one embodiment, a collection chamber 104C' employs an inline filter that is introduced parallel to the sidewalls of the collection chamber 104C', as illustrated in FIG. 9A-9B. With reference to the exploded view of FIG. 9A, the collection chamber 104C' includes two collection chamber walls 902A, 902B, a filter member 904, and a frame 906. The frame 906 is a portion of the frame 202 and includes an opening 910 dimensioned to receive the filter member 904, where the frame 906 and the filter member 904 are hermetically sealed together. The collection chamber walls 902A, 902B further enclose the frame 906 within the collection chamber 104C' and is hermetically sealed to one another about the periphery of the frame 906.

The collection chamber 104C' so constructed is illustrated in cross-section in FIG. 9B. It may be observed that the filter member 904 separates the area enclosed by the collection chamber walls 902A, 902B into two chambers, 920A and 920. The inlet port 222A of the collection chamber 104C' is in fluid communication with the chamber 920A. The flow of dried plasma particles 232 and humid drying gas 234 entering the collection chamber 104C' flow into the first chamber 920A. Filter member 904 inhibits the dried plasma particles 232 from passing through the first chamber 920A and into the second chamber 920B, while the humid drying gas 234 freely passes through the filter 904 into the second chamber 920B. Accordingly, the dried plasma particles 232 are retained for storage within the first chamber 920A, while the humid drying gas 234 exits the collection chamber 104C' via the exhaust port 222B.

Figure 10A:
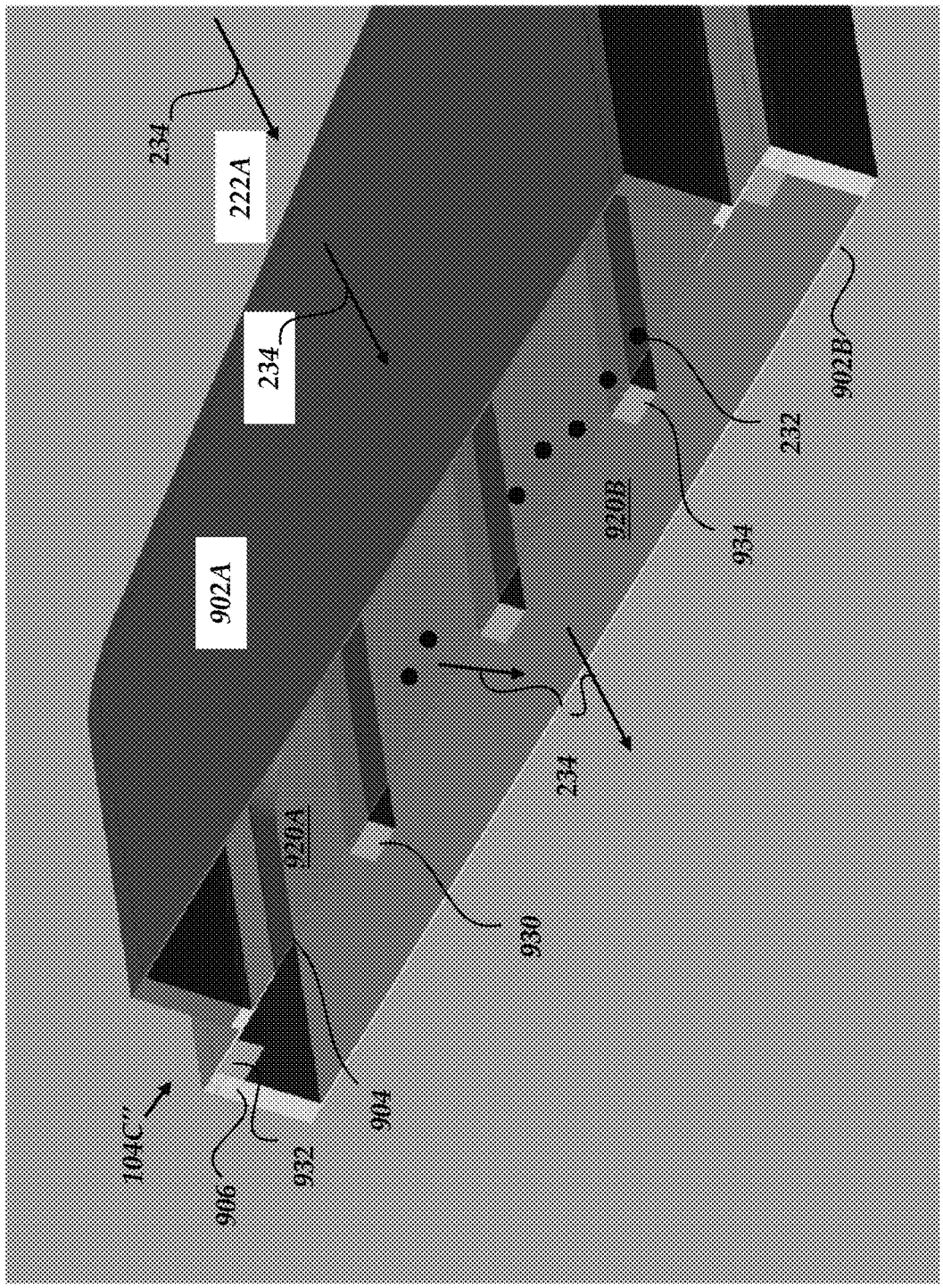
FIGS. 10A-10B is a schematic illustration of a second alternative embodiment of the filter of the collection chamber of FIGS. 2A-2B.
Figure 10B:
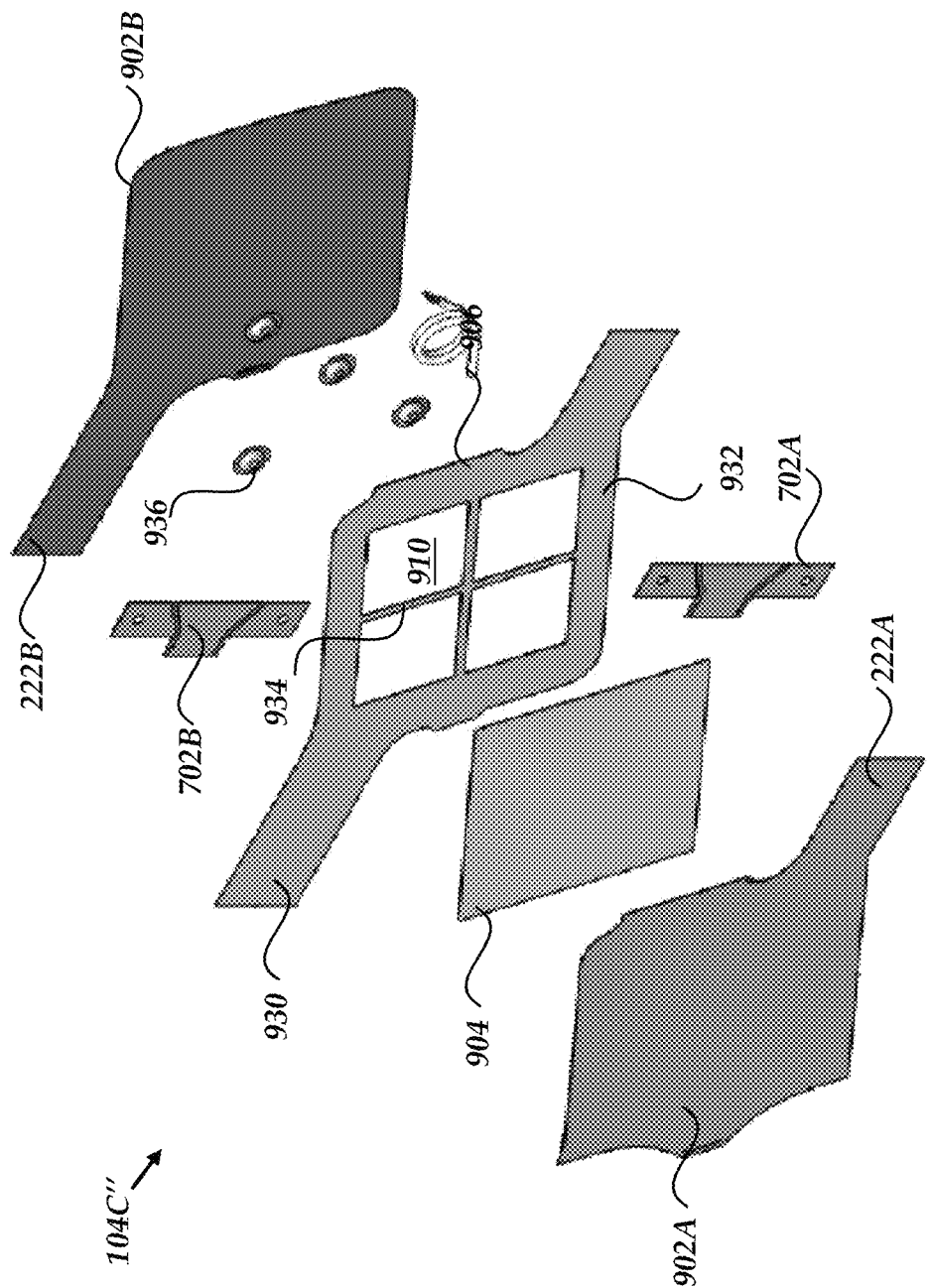

FIGS. 10A-10B illustrate alternative embodiments of a collection chamber 104C". The collection chamber 104C" is adapted to inhibit contact between the filter 904 at least one of the collection chamber wall 902A and the collection chamber wall 902B. With reference to the embodiment of FIG. 10A, the collection chamber 104C" is similar to collection chamber 104C', with the addition of a spacer frame 930 mounted to the frame 906. The spacer frame 930 includes a periphery 932 enclosing the opening 910 and a plurality of ribs 934 spanning the periphery 932. With reference to FIG. 10B, a plurality of standoffs 936 are secured to the collection chamber wall 902B and replace the ribs 934. Beneficially, both the ribs 934 and standoffs 936 provide an offset distance between the filter member 904 and collection chamber wall 902B which allows a clear path for airflow between the filter member 904 and exhaust port 222B during inflation of the collection chamber 104C''. It may be understood that, in alternative embodiments, the ribs 934 and/or standoffs 936 may be adapted to provide an offset distance between the filter member 904 and the collection chamber wall 902A, or to provide an offset distance between the filter member 904 and both the collection chamber wall 902A and the collection chamber wall 902B.

The terms comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A spray drier assembly, comprising:
   an enclosure having a first end and a second end, the enclosure including a drying gas inlet adjacent to the first end adapted to receive a flow of drying gas;
   a spray drying head within the spray dryer assembly enclosure and positioned within the path of the flow of drying gas, wherein the spray drying head is adapted to receive a flow of aerosolizing gas and a flow of liquid sample, output an aerosolized flow of liquid sample, and expose the aerosolized flow of liquid sample to the drying gas passing therethrough;
   a first filter, disposed between the drying gas inlet and the spray drying head;
   the spray drier assembly enclosure further including:
   a drying chamber positioned between the spray drying head and the second end of the enclosure, the drying chamber adapted to receive the aerosolized flow of liquid sample and drying gas and separate the aerosolized flow of liquid sample into a dried powder suspended in humid air; and
   a spray drying collection chamber including an intake port, an exhaust port, an outer wall, and a second filter, wherein the perimeter of the second filter is positioned in a sealing arrangement with an interior surface of the collection chamber and is adapted to separate the dried powder from the humid air, and forms a pouch-shape and the exhaust port allowing the humid air to exit the second end of the enclosure, wherein the spray drying collection chamber can be sealed and detached from the drying chamber.

2. The spray drier assembly of claim 1, further comprising a removable drying gas inlet cover that inhibits contaminants from entering the spray drier assembly through the drying gas inlet.

3. The spray drier assembly of claim 1, wherein the drying gas inlet is adapted to receive the flow of drying gas parallel to a longitudinal axis of the enclosure.

4. The spray drier assembly of claim 1, wherein the drying gas inlet is adapted to receive the flow of drying gas perpendicular to a longitudinal axis of the enclosure.

5. The spray drier assembly of claim 1, wherein the drying gas inlet is adapted to receive the flow of drying gas at different rates and different temperatures when it is in fluid communication with the spray drier device.

6. A spray drier assembly, comprising:
   a spray drier assembly body having a first end and a second end;
   a drying gas inlet providing a source of drying gas in fluid communication with the first end of the spray drier assembly body;
   a spray drying head enclosed within the spray dryer assembly body, the spray drying head comprising an aerosolizer for aerosolizing a flow of liquid sample received at the spray drying head, wherein the spray drying head is adapted to output the aerosolized flow of liquid sample and expose the aerosolized flow of liquid sample to the flow of drying gas;
   a first filter, disposed between the drying gas inlet and the spray drying head,
   a drying chamber positioned between the spray drying head and the second end of the spray drier assembly body, the drying chamber adapted to separate the aerosolized flow of liquid sample into a dried sample powder suspended in humid air; and
   a spray drying collection chamber including an intake port, an exhaust port, an outer wall, and a second filter, wherein the perimeter of the second filter is positioned in a sealing arrangement with an interior surface of the collection chamber and is adapted to separate the dried powder from the humid air, and forms a pouch-shape and the exhaust port allowing the humid air to exit the second end of the spray drier body, wherein the spray drying collection chamber can be sealed and detached from the drying chamber.

7. The spray dryer assembly of claim 6, wherein the drying gas travels in a flow to direct the transfer of dried liquid sample or the humid air from the drying chamber to the collection chamber.

* * * * *